(12) United States Patent
Nam et al.

(10) Patent No.: US 10,976,558 B2
(45) Date of Patent: Apr. 13, 2021

(54) ELECTRONIC DEVICE CAPABLE OF ADJUSTING DISTANCE BETWEEN HOUSINGS

(71) Applicant: Samsung Electronics Co., Ltd., Suwon-si (KR)

(72) Inventors: Minhyuk Nam, Suwon-si (KR); Yunguk Lee, Suwon-si (KR); Yongsang Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 104 days.

(21) Appl. No.: 16/375,433

(22) Filed: Apr. 4, 2019

(65) Prior Publication Data
US 2019/0317331 A1    Oct. 17, 2019

(30) Foreign Application Priority Data
Apr. 13, 2018   (KR) ........................ 10-2018-0043409

(51) Int. Cl.
*G02C 1/00* (2006.01)
*G02C 5/00* (2006.01)
(Continued)

(52) U.S. Cl.
CPC ...... *G02B 27/0176* (2013.01); *G02B 27/0172* (2013.01); *G02B 2027/014* (2013.01);
(Continued)

(58) Field of Classification Search
CPC ......... A61B 3/103; A61B 3/152; A61B 3/024; A61B 3/18; A61B 3/1015; G02B 27/145; G02B 27/44; G02B 27/0172; G02C 11/00; G02C 7/02; G02C 5/00; G02C 5/02; G02C 7/04
(Continued)

(56) References Cited

U.S. PATENT DOCUMENTS

| 2004/0070825 A1 | 4/2004 | Charlesworth |
| 2012/0162764 A1 | 6/2012 | Shimizu |

(Continued)

FOREIGN PATENT DOCUMENTS

CN    206348526 U    7/2017

OTHER PUBLICATIONS

International Search Report with Written Opinion dated Jul. 11, 2019; International Appln. No. PCT/KR2019/004007.

*Primary Examiner* — Dawayne Pinkney
(74) *Attorney, Agent, or Firm* — Jefferson IP Law, LLP

(57) ABSTRACT

An electronic device is provided. The electronic device includes a first housing including a first display device and a first connection unit having a first protrusion formed thereon, a second housing including a second display device coupled to the first connection unit to be movable in a predetermined direction and a second connection unit having a second protrusion formed thereon, and a circular plate including a spiral recess, the circular plate being coupled to the first protrusion and the second protrusion. The circular plate is configured such that, by rotation of the circular plate, the first protrusion and the second protrusion move in a predetermined direction, and depending on the movement, a distance between the first housing and the second housing is adjustable.

20 Claims, 16 Drawing Sheets

(51) Int. Cl.
     *G02C 5/04*      (2006.01)
     *G02C 3/00*      (2006.01)
     *G02B 27/01*     (2006.01)

(52) U.S. Cl.
     CPC ............ *G02B 2027/0138* (2013.01); *G02B 2027/0154* (2013.01); *G02B 2027/0178* (2013.01)

(58) Field of Classification Search
     USPC ....... 351/159, 159.01, 41, 124, 128, 159.75, 351/200, 205, 208, 222, 245–246, 159.73, 351/178, 159.74; 359/618–630
     See application file for complete search history.

(56) References Cited

U.S. PATENT DOCUMENTS

| | | |
|---|---|---|
| 2016/0005231 A1 | 1/2016 | Yamaga |
| 2016/0341967 A1 | 11/2016 | Kaji et al. |
| 2017/0237977 A1 | 8/2017 | Patel |
| 2019/0159354 A1* | 5/2019 | Zheng ..................... A42B 1/24 |

* cited by examiner

ELECTRONIC DEVICE CAPABLE OF ADJUSTING DISTANCE BETWEEN HOUSINGS

CROSS-REFERENCE TO RELATED APPLICATION(S)

This application is based on and claims priority under 35 U.S.C. § 119(a) of a Korean patent application number 10-2018-0043409, filed on Apr. 13, 2018, in the Korean Intellectual Property Office, the disclosure of which is incorporated by reference herein in its entirety.

BACKGROUND

1. Field

The disclosure relates to an electronic device. More particularly, the disclosure relates to an electronic device, which is wearable on a part of a human body and having at least one adjustable feature to conform the electronic device to a respective human body.

2. Description of the Related Art

The term "electronic device" refers to a device that performs a specific function according to an equipped program, such as an electronic scheduler, a portable multimedia reproducer, a mobile communication terminal, a tablet PC, an image/sound device, a desktop/laptop PC, or a vehicular navigation system, as well as home appliances. The above-mentioned electronic devices may output, for example, information stored therein as sound or an image. As the integration degree of such electronic devices has increased, and super-high speed and large-capacity wireless communication has become popular, various functions have recently been provided in a single mobile communication terminal. For example, various functions, such as entertainment functions (e.g., a game function), multimedia functions (e.g., a music/video reproducing function), communication and security functions for mobile banking, schedule management functions, and e-wallet functions, are integrated in a single electronic device, in addition to communication functions.

Such a portable electronic device (e.g., an electronic scheduler, a portable multimedia reproducer, a mobile communication terminal, or a tablet PC) is generally equipped with a display device and a battery, and has a bar-type, folder-type, or sliding-type appearance due to the inclusion of a display or battery. In recent years, as the performance of display devices and batteries have been improved, electronic devices, which are miniaturized to be capable of being worn on a part of a human body, such as the wrist or the head, have appeared.

In order to carry an electronic device or to make the electronic device wearable on a part of a human body, a display, processor, and/or battery having a shape designed to be suitable for miniaturization, weight reduction, and wearability of the electronic device, and having a sufficient capacity may be required. Further, such a device would require at least one adjustable feature to conform the electronic device to a respective human body.

Typical wearable electronic devices are manufactured in a uniform appearance in which different head shapes or inter pupillary distances (IPDs) of respective users are not taken into consideration, and may thus provide images such as distorted or unclear photographs and/or pictures.

For example, when a user has a large head relative to the wearing structure of a wearable electronic device, the wearing structure of the wearable electronic device may be bent, and the output direction of light emitted from a light output device such as a projector built in a temple portion may be changed and a distorted image may be provided to the user. As another example, when a user has a large head relative to the wearing structure of a wearable electronic device, a connection portion disposed between two display devices of the wearable electronic device may be warped, which may result in variation in the angle between the eyes and the display devices, thereby making the user feel dizzy. As another example, when the positions of both eyes of a user and the positions to which an image such as a photograph and/or a picture are dislocated according to the user's IPD, a proper focus may not be located in the image.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

In accordance with an aspect of the disclosure, a wearable electronic device is provided that can be adjusted according to the size of a user's head by adjusting the distance between respective display devices that provide an image to the user.

In accordance with another aspect of the disclosure, a wearable electronic device is provided that prevents warping of an optical path provided in an optical output device, such as a projector, by adjusting the distance between respective display devices that provide an image to the user.

In accordance with another aspect of the disclosure, a wearable electronic device is provided in which display devices are able to output images at positions corresponding to the focuses of the user's eyes by adjusting the distance between the respective display devices that provide an image to the user.

In accordance with another aspect of the disclosure, a wearable electronic device is provided that includes a first housing including a first display device configured to provide visual information, and a first connection unit having a first protrusion formed thereon, a second housing including a second display device coupled to the first connection unit to be movable in a predetermined direction and configured to provide visual information, and a second connection unit having a second protrusion formed thereon, and a circular plate including a spiral recess, the circular plate being coupled to the first protrusion in a first region of the recess and being coupled to the second protrusion in a second region of the recess spaced apart from the first region by a first predetermined interval. The circular plate may be configured such that, by the rotation of the circular plate, the first protrusion and the second protrusion move in a predetermined direction along the recess such that the first predetermined interval may be changed to a second predetermined interval, and depending on the second predetermined interval, the distance between the first housing and the second housing may be adjustable.

In accordance with another aspect of the disclosure, a wearable electronic device is provided that includes a first display device configured to provide visual information, a second display device disposed to be spaced apart from the first display device and configured to provide visual information, and a distance adjustment structure disposed between the first display device and the second display device, and configured to adjust the distance between the first display device and the second display device. The distance adjustment structure may include a first connection unit disposed to extend from the first display device toward the second display device and including a first protrusion disposed to protrude in a direction perpendicular to the extension direction, a second connection unit disposed to extend from the second display device toward the first display device and including a second protrusion disposed to protrude in a direction perpendicular to the extension direction, and a curved plate including a spiral recess such that the first protrusion and the second protrusion are seated in the recess in a state of being spaced apart from each other so as to provide a spiral movement. As the curved plate rotates, the distance between the first protrusion and the second protrusion disposed in the spiral recess may be varied.

In accordance with another aspect of the disclosure, a wearable electronic device is provided that is able to include a distance adjustment structure that adjusts the distance between display devices that provide an image, such as a photo and/or picture, to correspond to both the user's eyes.

In accordance with another aspect of the disclosure, a wearable electronic device is provided that is able to prevent warping of an optical path provided by an optical output device such as a projector or to prevent bending of a connection portion between the display devices by adjusting the distance between the display devices that provide an image to a user.

In accordance with another aspect of the disclosure, a wearable electronic device is provided that is able to eliminate side effects such as phase distortion and dizziness by adjusting the wearable electronic device depending on a user's IPD.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
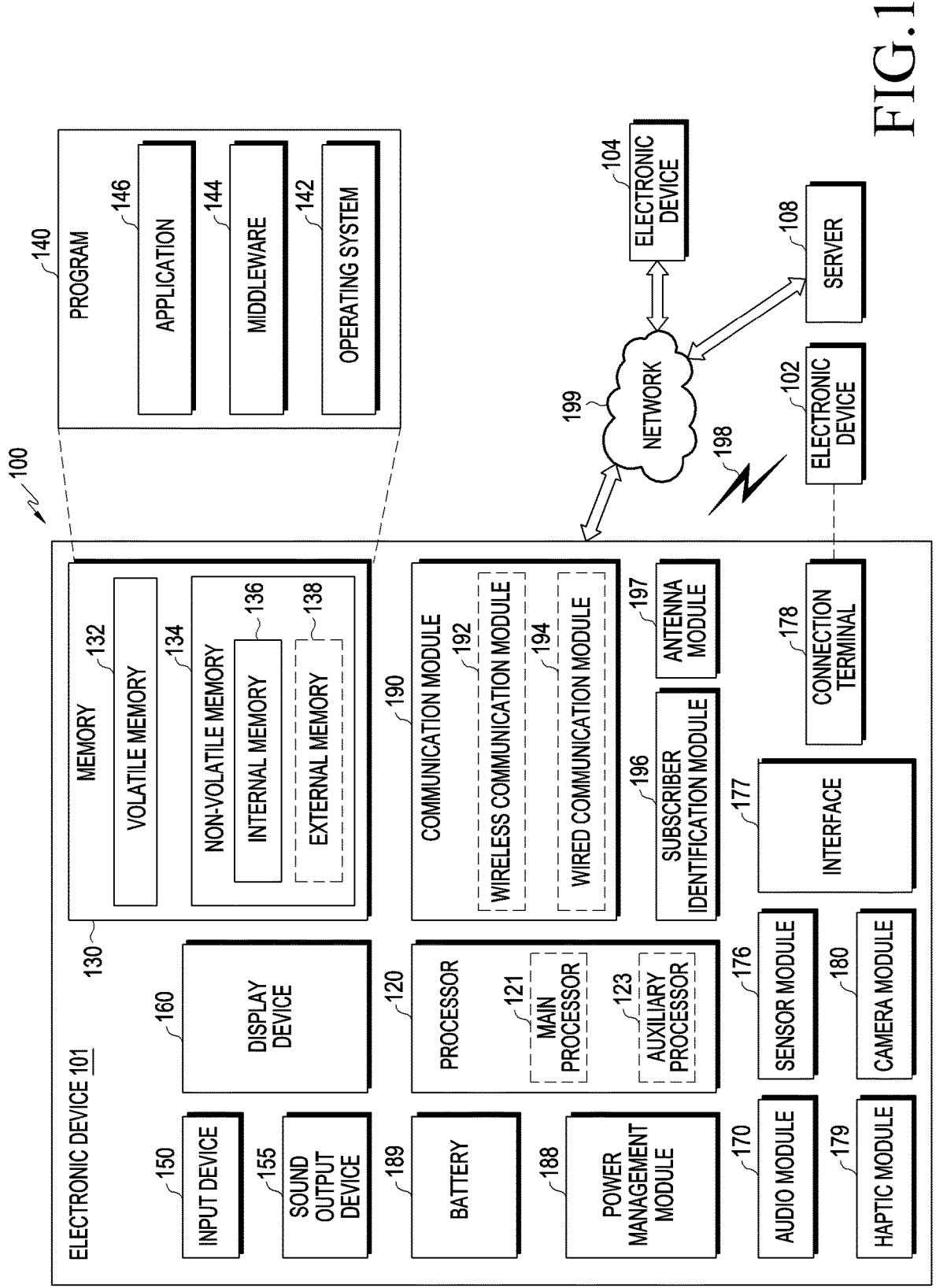
FIG. 1 is a block diagram illustrating a wearable electronic device in a network environment according to an embodiment of the disclosure.

FIG. 1 is a block diagram illustrating a wearable electronic device in a network environment according to various embodiments of the disclosure.

Referring to FIG. 1, a wearable electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and/or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a (CP)) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134. The non-volatile memory may include an internal memory 136 and/or an external memory 138.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing recordings, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may also include touch circuitry adapted to detect a touch, or sensor circuitry (e.g., a pressure sensor) adapted to measure the intensity of force incurred by the touch.

The audio module 170 may convert sound into an electrical signal and convert an electrical signal into sound. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly.

According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture still images or moving images. According to an embodiment, the camera module 180 may include one or more lenses, image sensors, image signal processors, or flashes.

The power management module 188 may manage power supplied to or used by the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, one or more of a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multiple components (e.g., multi-chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal and/or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 is to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smailphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
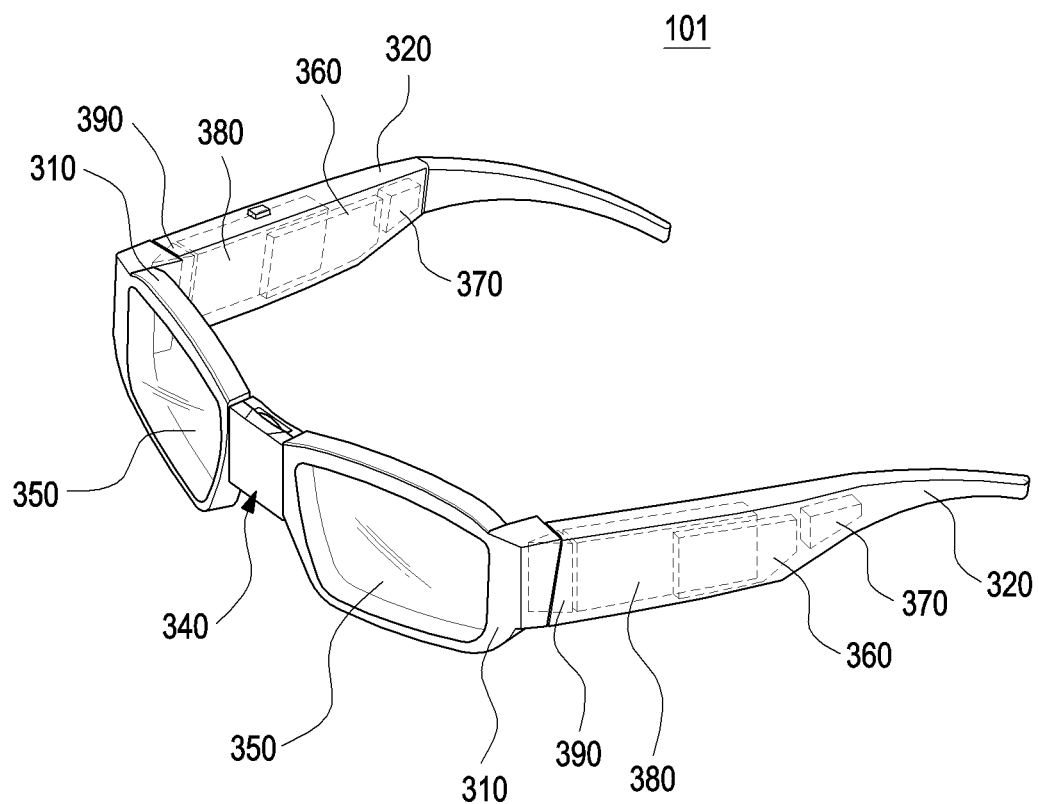
FIG. 2 is a perspective view illustrating a wearable electronic device according to an embodiment of the disclosure.

FIG. 2 is a perspective view illustrating a wearable electronic device according to various embodiments of the disclosure.

Referring to FIG. 2, the electronic device 101 may be implemented as a head-worn electronic device in which a pair of display devices 350 is respectively mounted on a pair of frame-shaped housings 310 and a pair of wearing members 320 respectively extends from the pair of housings 310 parallel or substantially parallel to each other. The electronic device 101 may include a distance adjustment structure 340 configured to adjust the length between the pair of housings, and circuit boards 360 and batteries 370, which are disposed within the wearing member 320. As another example, the electronic device 101 may include optical output devices 380 (e.g., projectors), light refraction modules 390 (e.g., prisms), or a display module (not illustrated) in the wearing members 320 of the electronic device 101. The structure of the electronic device 101 of FIG. 2 may be partly or wholly the same as the structure of the electronic device 101 of FIG. 1.

According to various embodiments, each display device 350 may include a display module, a projector, or a sensor equipped with a touch circuit, or the like, and the display of the display module may be a transparent or translucent display. As another example, the display device 350 may include a window member, which may be a translucent glass or a member of which the light transmittance may be adjusted as the coloring density thereof is adjusted. As another example, the display device 350 may include a lens including a waveguide, a reflective lens, or the like, and each of the lenses may transmit the light output from the output device to the user's eyes.

According to various embodiments, the pair of housings 310 may be in the form of a frame that at least partially surrounds the edges of each of the display devices 350 and may serve as a rim of a glasses structure including general sunglasses.

According to various embodiments, the circuit boards 360 may be respectively disposed in the pair of wearing members 320, and circuit wiring connecting the circuit boards may be disposed inside or outside the pair of housings 310. The pair of wearing members 320 extends parallel or substantially parallel to each other from the opposite ends of the pair of housings 310, thereby providing a means for allowing the user to wear the electronic device 101 on their body (e.g., their head). The pair of wearing members 320 may serve as temples of a general eyeglass structure. For example, the pair of housings 310 may be located on the user's face to position the display devices 350 to be aligned to the user's eyes, and the pair of wearing members 320 may be worn on the user's ears at opposite sides of the user's head.

According to various embodiments, the pair of wearing members 320 may be utilized in containing the circuit boards 360, the batteries 370, the optical output devices 380, the light refraction modules 390, and so on. For example, each of the pair of wearing members 320 may be provided with a housing structure capable of accommodating therein the circuit boards 360, the batteries 370, the optical output devices 380, or the light refraction module 390. As another example, the electronic device 101 may include the circuit boards 360, the batteries 370, the optical output devices 380, and the light refraction module 390 in each of the pair of wearing members 320. As another example, in disposing the circuit boards 360, the batteries 370, the optical output devices 380, or the light refraction modules 390, various modifications may be made in consideration of the weight distribution and wearing comfort of the electronic device 101.

According to an embodiment, there may be provided a plurality of circuit boards 360, one of which may be provided as a board that includes a driving circuit of the display devices 350, a control circuit configured to adjust coloring density, and a processor configured to process image information or the like. Another one of the circuit boards 360 may be provided as a circuit board mounted with a communication circuit and various connectors, which provide an interface with a user and a connection to another electronic device or a commercial communication network, and a sensor module (e.g., the sensor module 176 in FIG. 1). As another example, a microphone or speakerphone for inputting and outputting sound may also be disposed on one of the circuit boards 360 or adjacent to one of the circuit boards 360. However, the circuit arrangement of the circuit boards 360 and the functions thereof are not limited thereto, and may be variously adjusted as needed. For example, the sensor module may be disposed on each of the circuit boards 360.

According to an embodiment, the circuit boards 360 may be respectively disposed in the wearing members 320. In another example, the sensor module 176 may include a proximity sensor, an illuminance sensor, a gyro sensor, a camera module, a gaze tracker, a geomagnetic sensor, an accelerometer, or the like, and various sensors of the sensor module 176 do not necessarily have to be disposed on one of the circuit boards 360. For example, a camera module may be disposed at an appropriate position on the pair of housings 310 so as to be close to the user's gaze. The sensor module 176 may detect information on the surrounding environment necessary for setting an optimal use environment while monitoring the use environment of the electronic device 101 and the like. For example, the illuminance sensor mounted on the sensor module 176 may detect ambient illuminance and may provide information necessary to adjust the color density, brightness, or resolution of the display device 350.

According to an embodiment, a plurality of batteries 370 may be disposed so as to provide power to the circuit boards 360, the display module, or the like, and may be disposed in at least one of the wearing members 320 or may be respectively disposed on the wearing members 320.

According to an embodiment, a plurality of optical output devices 380 and a plurality of optical refraction modules 390 may be provided, and may be disposed in at least one of the pair of the wearing members 320 or may be respectively disposed on the wearing members 320. The light emitted from the light output devices 380 may reach the display devices 350 via the light refraction modules 390. The electronic device 101 using the optical output devices 380 may be of a waveguide type or of a reflective mirror type. For example, in the waveguide type, light emitted from a side light output device such as a projector is reflected by a grating area formed on the display devices using a waveguide such as a prism, and may be transmitted to the user's eyes. As another example, in the reflective mirror type, the light emitted from the optical output device may be directly reflected on the display devices in front of the user's eyes so as to provide visual information to the user's eyes.

According to an embodiment, the circuit boards 360, which can be respectively disposed in the pair of housings 310, may be connected to each other through circuit wiring (not illustrated). The circuit wiring may provide a transmission/reception path of various control signals and data between circuit boards. The circuit wiring may be formed using a coaxial cable, and may have other various types of transmission line structures such as a Flexible Printed Circuit Board (FPCB).

According to an embodiment, the electronic device 101 may also include an input device including a physical key or a touchpad. For example, input modules, such as a power key and a touchpad, may be exposed to the outside of the electronic device 101 as they are devices that require a user's direct contact.

According to various embodiments, the distance adjustment structure 340 may be disposed between the display devices 350. The distance adjustment structure 340 may be disposed between the pair of housings 310, and may adjust the separation distance of the display devices 350 in consideration of the user's head. Hereinafter, the distance adjustment structure will be described in detail.

Figure 3:
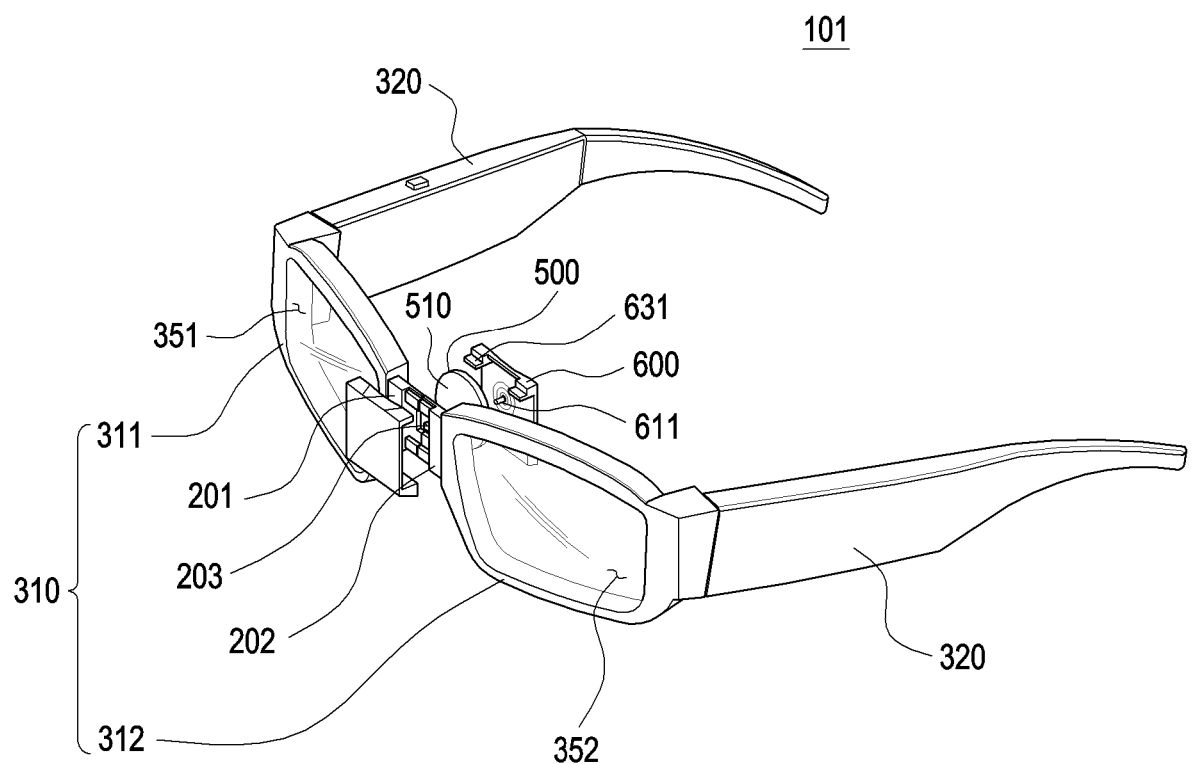
FIG. 3 is an exploded perspective view illustrating a wearable electronic device according to an embodiment in the state in which a distance adjustment structure is disassembled according to an embodiment of the disclosure.
Figure 4:
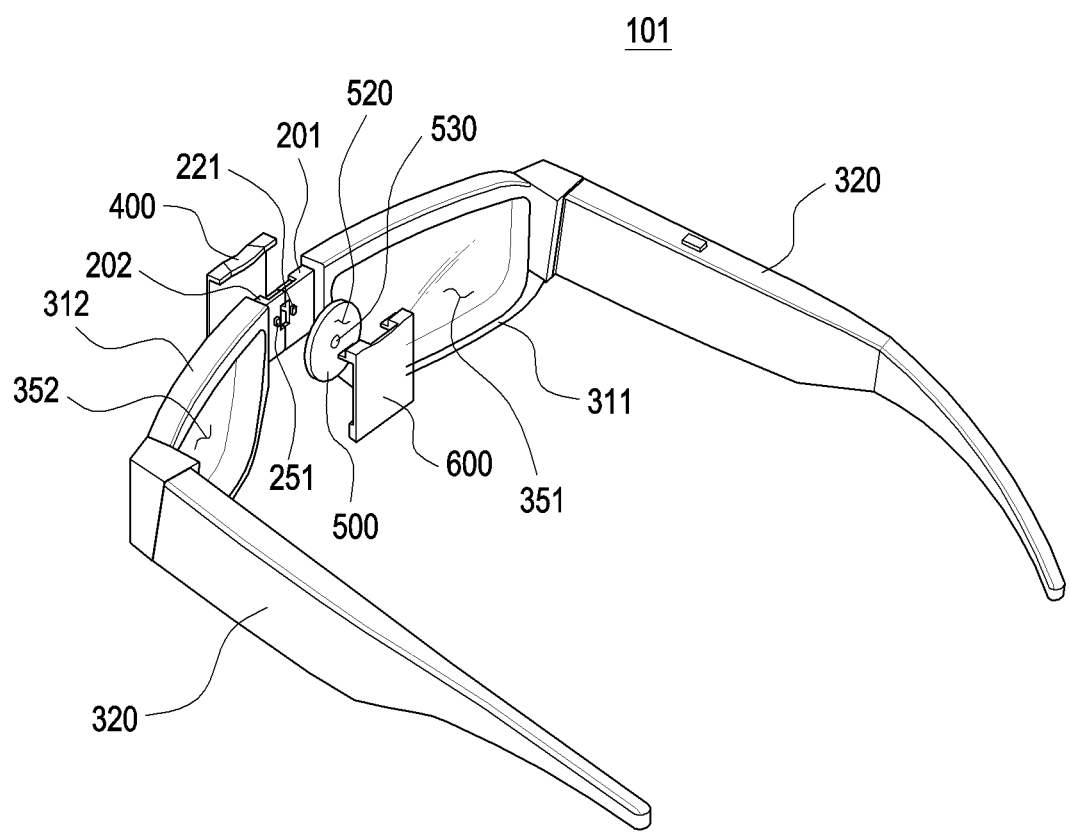
FIG. 4 is an exploded perspective view of a wearable electronic device of FIG. 3, which is viewed in another direction according to an embodiment of the disclosure.

FIG. 3 is an expanded perspective view illustrating a wearable electronic device according to various embodiments in a state in which a distance adjustment structure is disassembled. FIG. 4 is an expanded perspective view of a wearable electronic device of FIG. 3, which is viewed in another direction.

Referring to FIGS. 3 and 4, the wearable electronic device 101 may include a first housing 311 including a first display device 351, a second housing 312 including a second display device 352, a curved plate (e.g., a circular plate 500), a first cover 400, and a second cover 600. The first housing 311 may include a first connection unit 201 and the second housing 312 may include a second connection unit 202. The structure of the electronic device 101 of FIGS. 3 and 4 may be partly or wholly the same as the structure of the electronic device 101 of FIG. 1 or the electronic device 101 of FIG. 2.

According to various embodiments, the user may wear the electronic device 101, and may adjust the distance between the first housing 311 and the second housing 312 through the distance adjustment structure depending on the size of the user's head. The distance adjustment structure of the electronic device 101 may include the first connection unit 201, the second connection unit 202, the circular plate 500, the first cover 400, and the second cover 600.

According to various embodiments, the first connection unit 201 and the second connection unit 202 may be disposed so as to face each other, and may be guided by the circular plate 500 and the first cover 400 to move horizontally. For example, the first connection unit 201 and the second connection unit 202 may move so as to be spaced apart from each other in the horizontal direction (or in different movement directions), and the adjustable separation distance therebetween may be approximately 0 to 20 mm.

Figure 6:
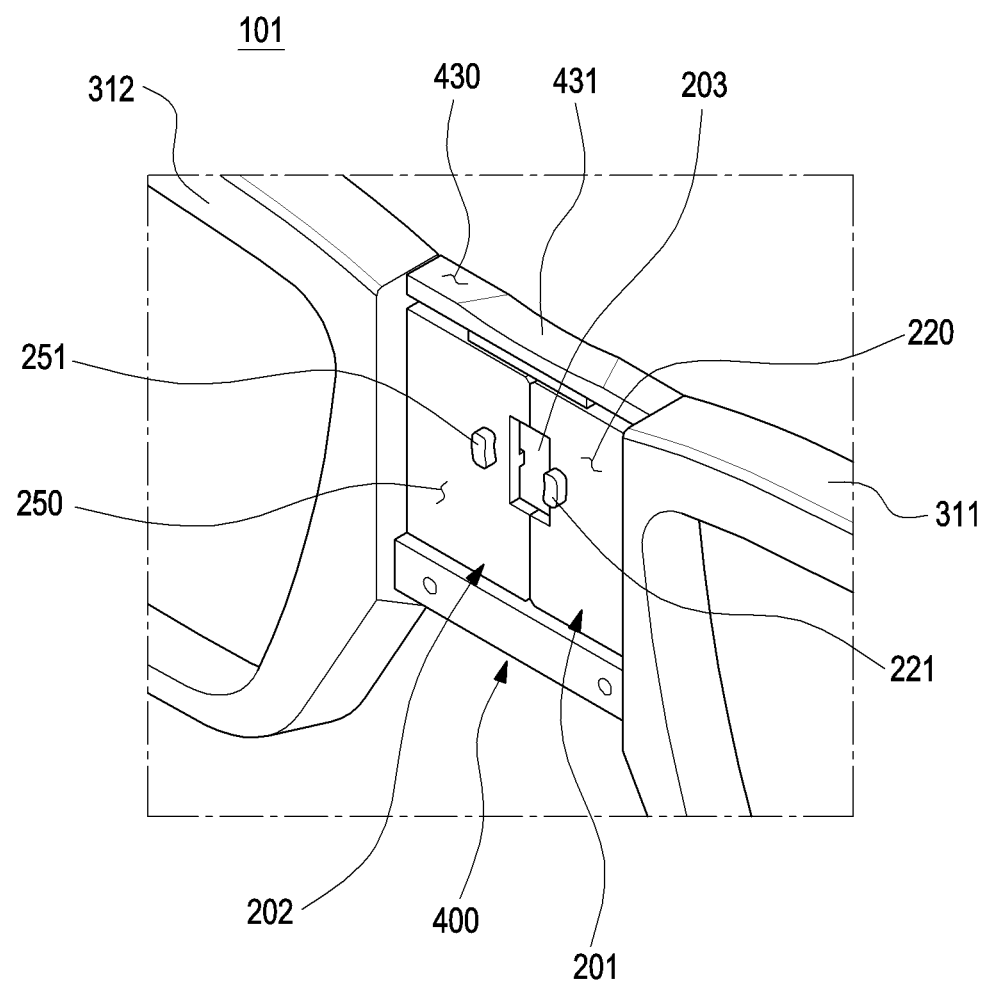
FIG. 6 is an enlarged perspective view illustrating a rear side of a first connection unit and a second connection unit of a distance adjustment structure in a wearable electronic device according to an embodiment of the disclosure.

According to various embodiments, the first connection unit 201 may be disposed so as to extend from the end of the first housing 311 toward the second housing 312, and may include at least one protrusion (e.g., a first protrusion 221 in FIG. 6). The second connection unit 202 extends from the end of the second housing 312 toward the first housing 311, and may include at least one protrusion (e.g., a second protrusion 251 in FIG. 6). According to an embodiment, the front faces of the first connection unit 201 and the second connection unit 202 may include a seating face on which at least a portion of the first cover 400 is fixedly seated, and the rear faces of the first connection unit 201 and the second connection unit 202 may include a seating face on which at least a portion of the second cover 600 and/or the circular plate 500 may be fixedly seated.

According to various embodiments, when the first connection unit 201 and the second connection unit 202 are disposed to be in contact with each other, an opening 203 is formed in the central region thereof, and a boss 611 of the second cover 600 may pass through the opening 203 so as to support the first cover 400 and the circular plate 500.

According to various embodiments, the circular plate 500 may include a first face 510 disposed to face the first connection unit 201 and the second connection unit 202, and a second face 520 disposed to face the second cover 600. For example, the first face 510 may include a spiral recess (e.g., a recess 511 in FIG. 10), and may include a region capable of engaging with the first protrusion 221 of the first connection unit 201 and the second protrusion 251 of the second connection unit 202. As another example, the circular plate 500 may include a through hole 530 in the center thereof, and may be coupled with the second cover 600. The boss 611 of the second cover 600 may be connected to the first cover 400 through the through hole 530.

According to various embodiments, the first cover 400 is formed to cover at least a portion of the front face of each of the first connection unit 201 and the second connection unit 202, and may protect the first connection unit 201 and the second connection unit 202 from being exposed to the outside. As another example, the first cover 400 may be formed to enclose at least a portion of the side face of the first connection unit 201 and/or the side face of the second connection unit 202. For example, the first cover 400 may be formed to enclose at least a portion of the upper face and/or the lower face of the first connection unit 201 and/or the second connection unit 202 so as to hinder the first connection unit 201 and/or the second connection unit 202 from playing in a direction other than the horizontal direction when moving in the horizontal direction.

Figure 7:
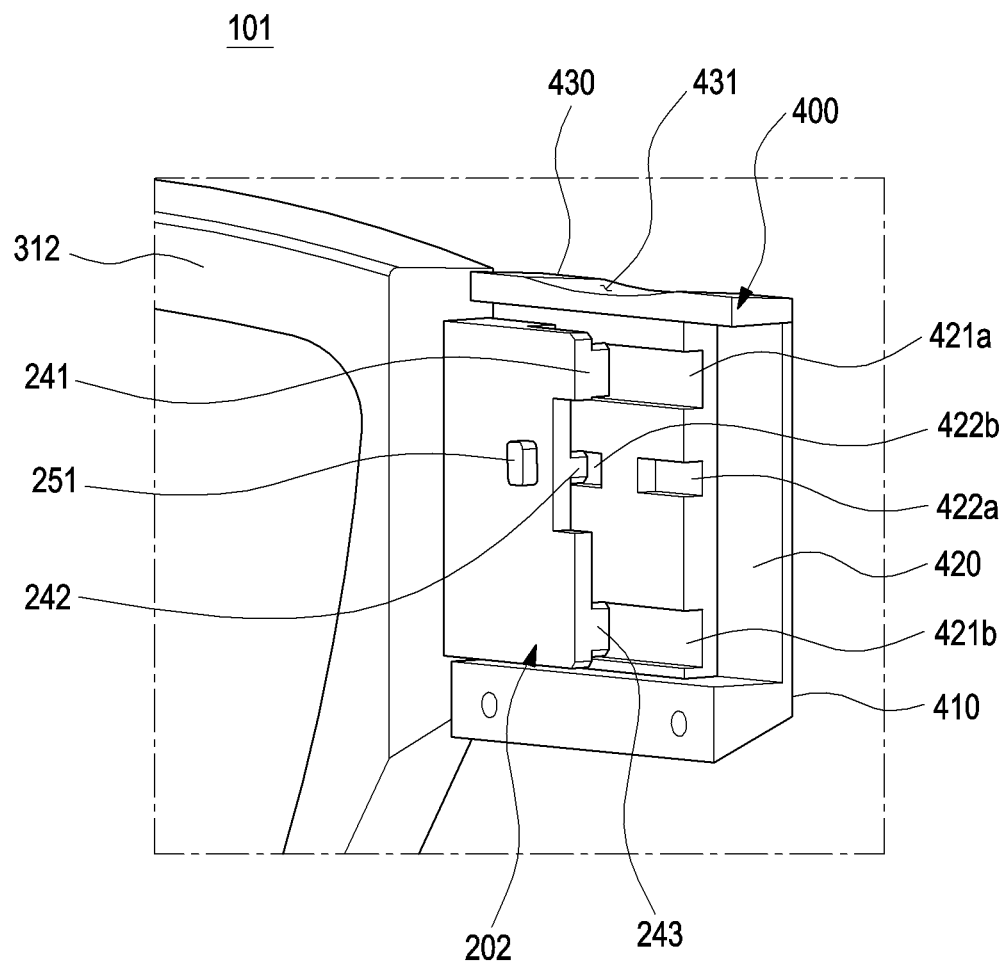
FIG. 7 is a perspective view illustrating a first cover coupled to a first connection unit of a wearable electronic device according to an embodiment of the disclosure.

The first cover 400 may include guide grooves and stoppers (e.g., guide groove 421a, and 421b, and stoppers 422a, and 422b in FIG. 7) configured to guide the first and second connectors 201 and 202 to move in the horizontal direction when the separation distance between the first and second connectors 201 and 202 is varied. The guide lines 211, 212, and 213 of the first connection unit 201 and the second connection unit 202 (e.g., the guide lines 211, 212, and 213 in FIG. 5) may be moved in the horizontal direction along the guide grooves of the first cover 400, and may be suppressed from playing in a direction other than the horizontal direction. The guide lines may restrict the vertical movement of the first connection unit 201 and the second connection unit 202.

According to various embodiments, the second cover 600 may be formed to cover at least a portion of the rear face of each of the first connection unit 201 and the second connection unit 202, and may protect the first connection unit 201 and the second connection unit 202 from being exposed to the outside. As another example, the second cover 600 may be formed to enclose at least a portion of the side face of the first connection unit 201 and/or the side face of the second connection unit 202. For example, the second cover 600 may be formed to enclose at least a portion of the upper face and/or the lower face of the first connection unit 201 and/or the second connection unit 202 so as to hinder the second connection unit 201 and/or the second connection unit 202 from playing in a direction other than the horizontal direction when moving in the horizontal direction.

The second cover 600 may include at least one boss 611, which may pass through the through hole 530 in the circular plate 500 and the opening 203 so as to be connected to the first cover 400. The second cover 600 may also include at least one hook 631, and may be coupled to the first cover 400 so as to support the circular plate 500 disposed therein.

Hereinafter, each component of the distance adjustment structure will be described in detail.

Figure 5:
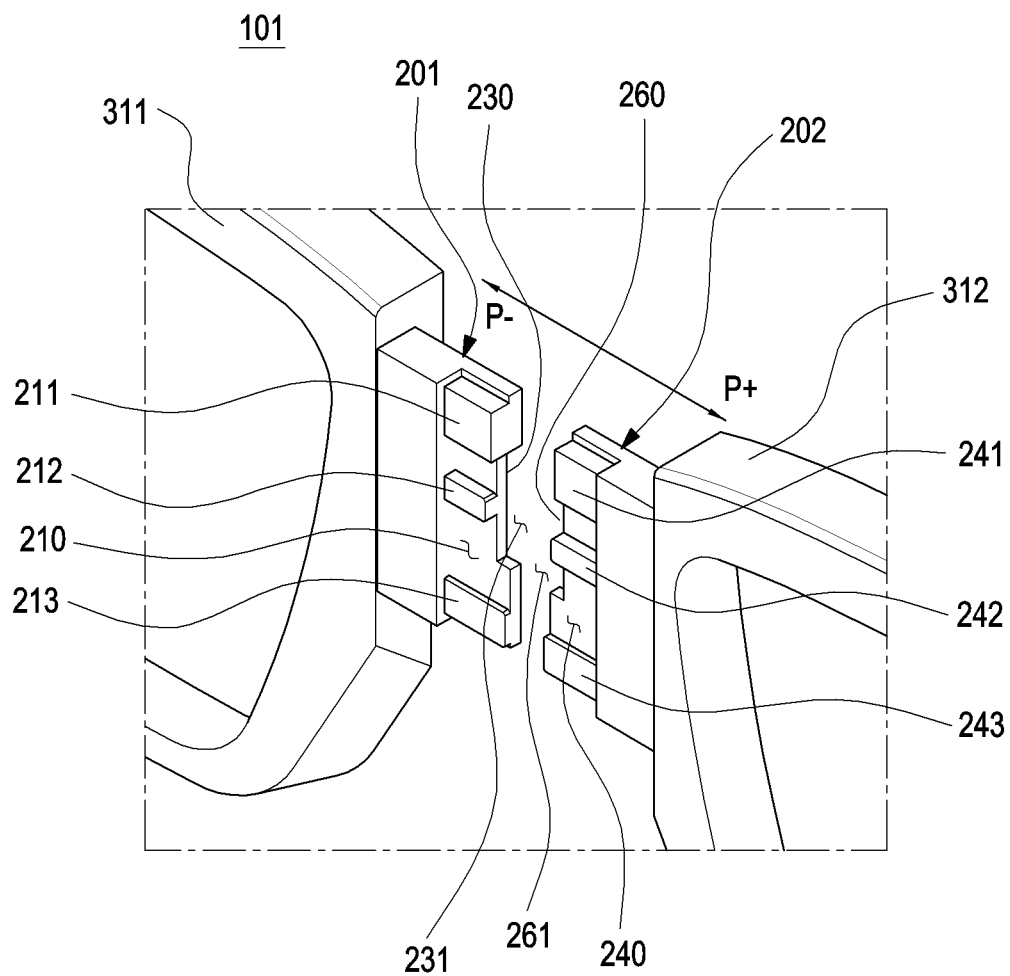
FIG. 5 is an enlarged perspective view illustrating a front side of a first connection unit and a second connection unit of a distance adjustment structure in a wearable electronic device according to an embodiment of the disclosure.

FIG. 5 is an enlarged perspective view illustrating a front side of a first connection unit and a second connection unit of a distance adjustment structure in a wearable electronic device according to various embodiments of the disclosure. FIG. 6 is an enlarged perspective view illustrating a rear side of a first connection unit and a second connection unit of a distance adjustment structure in a wearable electronic device according to various embodiments of the disclosure. FIG. 7 is a perspective view illustrating a first cover coupled to a first connection unit of a wearable electronic device according to various embodiments of the disclosure.

Referring to FIGS. 5 to 7, the electronic device 101 may include the first housing 311 including the first connection unit 201, the second housing 312 including the second connection unit 202, and the first cover 400. The structure of the electronic device 101 of FIGS. 5 to 7 may be partly or wholly the same as the structure of the electronic device 101 of FIGS. 2 to 4.

According to various embodiments, the first connection unit 201 and the second connection unit 202 may be disposed so as to face each other, and may be guided by the circular plate 500 and the first cover 400 to move in the horizontal direction. For example, the first connection unit 201 and the second connection unit 202 may move so as to be spaced apart from each other in the horizontal direction (or in different movement directions), and the separation distance therebetween may be 0 to 20 mm.

According to various embodiments, the first connection unit 201 may be disposed so as to extend from the end of the first housing 311 toward the second housing 312, and may be provided in a plate shape. The first connection unit 201 may include a first front portion 210 facing the front side and a first rear portion 220 facing the rear side. As another example, the first connection unit 201 may include a first side portion 230 enclosing at least a portion of a gap between the first front portion 210 and the first rear portion 220.

According to an embodiment, the first front portion 210 may include at least one first guide line 211, 212, or 213 protruding to the front side. The first guide line 211, 212, or 213 may extend in the horizontal direction from the end of the first connection unit 201, and may be coupled with the first cover 400 so as to guide the movement of the first connection unit 201 in the horizontal direction (+P or −P). For example, there may be provided a plurality of first guide lines 211, 212, and 213, which may include the (1-1)$^{th}$ guide line 211 disposed in the upper end region, the (1-3)$^{th}$ guide line 213 disposed in the lower end region, and the (1-2)$^{th}$ guide line 212 disposed between the (1-1)$^{th}$ guide line 211 and the (1-3)$^{th}$ guide line 213.

According to an embodiment, the (1-1)$^{th}$ guide line 211 and the (1-3)$^{th}$ guide line 213 may be in contact with the guide groove 421a or 421b formed in the first cover 400 so as to help the first connection unit 201 to reciprocally slide without shaking when the first connection unit 201 is horizontally moved. As another example, the (1-2)$^{th}$ guide line 212 may be in contact with a guide groove (e.g., the stopper 422a) formed in the first cover 400 so as to provide a non-shaking horizontal movement while moving within a predetermined separation distance.

According to an embodiment, the (1-1)$^{th}$ guide line 211, the (1-2)$^{th}$ guide line 212, and the (1-3)$^{th}$ guide line 213 may have different widths and different lengths, and may be arranged to respectively correspond to second guide lines 241, 242, and 243 formed in the second connection unit 202. However, the number of the first guide lines 211, 212, and 213 is not limited to three. Through a design change, one first guide line or two or more first guide lines may be provided by adjusting the width and length thereof.

According to an embodiment, the first rear portion 220 may include at least one first protrusion 221 protruding to the rear side. The first protrusion 221 may be coupled to the circular plate (e.g., the circular plate 500 in FIG. 10) so as to provide stable movement for the first connection unit 201. For example, the first protrusion 221 may move in the state of being inserted into and seated in a region of the spiral recess 511 formed in the circular plate 500. The first protrusion 221 may move in the horizontal direction (+P or −P) with respect to the second protrusion 251. For example, the first protrusion 221 may move in response to the rotation of the circular plate 500. The seated position of the first protrusion 221 in the spiral recess 511 may be variable.

According to an embodiment, the circular plate 500 may rotate clockwise or counterclockwise, and the first protrusion 221 seated in the spiral recess 511 may move in the circular plate 500 along the spiral recess 511. For example, when the circular plate 500 is rotated in the first direction (e.g., clockwise), the position of the first protrusion 221, which is seated in the spiral recess 511, is varied to the edge region from the center region of the circular plate 500 along the spiral recess 511, so that the separation distance of the first connection unit 201 with respect to the second connection unit 202 can be increased. As another example, when the circular plate 500 is rotated in the second direction (e.g., counterclockwise), the position of the first protrusion 221, which is seated in the spiral recess 511, is varied to the center region from the edge region of the circular plate 500 along the spiral recess 511, so that the separation distance of the first connection unit 201 with respect to the second connection unit 202 can be reduced.

According to an embodiment, the first protrusion 221 may be disposed on the first rear portion 220. For example, the first protrusion 221 may be disposed opposite the (1-2)$^{th}$ guide line 212 of the first front portion 210, and may be formed to have a thickness corresponding to the spiral recess 511 in the circular plate 500.

Figure 9:
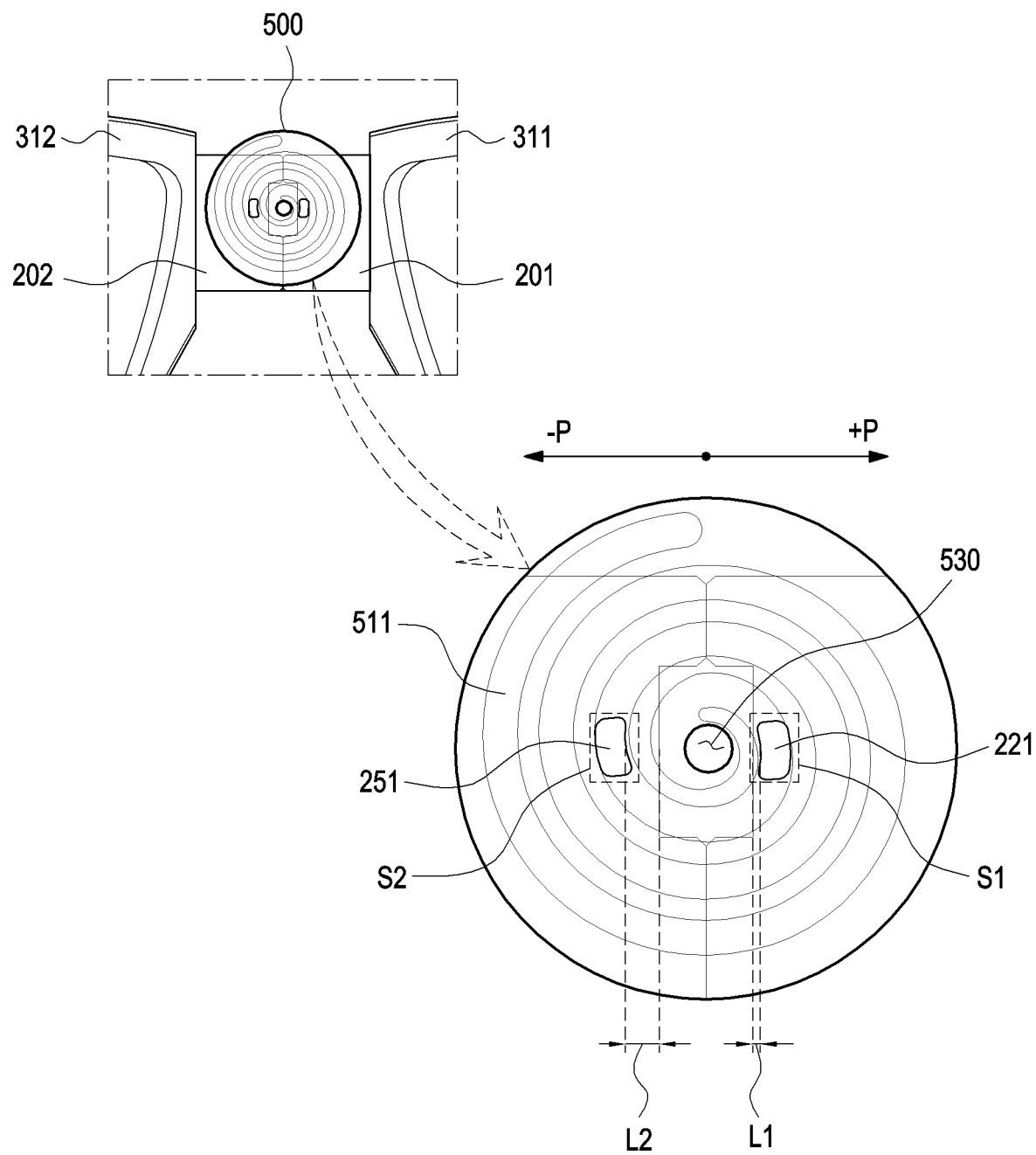
FIG. 9 is a projection view illustrating a circular plate coupled to first and second connection units of a wearable electronic device according to an embodiment of the disclosure.

According to an embodiment, the first protrusion 221 may be spaced apart from the side end of the first rear portion 220 by a first distance (e.g., a first distance L1 in FIG. 9). The first distance L1 may be the distance for the first protrusion 221 to be seated in the spiral recess 511 in the circular plate 500, and may be different from a second distance (e.g., a second distance L2 in FIG. 9) by which the second protrusion 251 formed on the second connection unit 202 is spaced apart from the side end of a second rear portion 250. For example, the spiral recess 511 in the circular plate 500 may have a spiral shape, and the first protrusion 221 and the second protrusion 251 may be provided at positions that do not correspond to each other, so as to be seated in the recess shape. According to an embodiment, it is exemplified that one first protrusion 221 is provided on the first rear portion 220, but is not limited thereto. Through a design change, two or more first protrusions 221 may be provided in various shapes to be seated and supported in the spiral recess 511 in the circular plate 500.

According to various embodiments, the first connection unit 201 may also include the first side portion 230 that is capable of being exposed toward the second housing 312, and the first side portion 230 may include at least one first recess 231. The first side portion 230 may be in contact with a second side portion 260 of the second connection unit 202 or may be spaced apart from the second side portion 260 of the second connection unit 202 depending on the distance adjustment between the first connection unit 201 and the second connection unit 202.

According to an embodiment, the first recess 231 formed in the first side portion 230 may be coupled to a second recess 261 in the second side portion 260 of the second connection unit 202 so as to form a single closed opening 203. The opening 203 may be disposed so as to penetrate through the first connection unit 201 and the second connection unit 202, and may provide a space into which the boss (e.g., the boss 611 in FIG. 3) formed in the second cover (e.g., the second cover 600 in FIG. 3) is inserted. For example, the boss 611 of the second cover 600 may be coupled to the first cover 400 by passing through the through hole 530 in the center of the circular plate 500 and through the opening 203.

According to various embodiments, the second connection unit 202 may be disposed so as to extend from the end of the second housing 312 toward the first housing 311, and may be provided in a plate shape. The second connection unit 202 may include a second front portion 240 facing the front side and the second rear portion 250 facing the rear side. As another example, the second connection unit 202 may include the second side portion 260 enclosing at least a portion of a gap between the second front portion 240 and the second rear portion 250.

According to an embodiment, the second front portion 240 may include at least one second guide line 241, 242, or 243 protruding to the front side. The second guide line 241, 242, or 243 may extend in the horizontal direction from the end of the second connection unit 202, and may be coupled with the first cover 400 so as to guide the movement of the second connection unit 202 in the horizontal direction (+P or −P). For example, there may be provided a plurality of second guide lines 241, 242, and 243, which may include the (2-1)$^{th}$ guide line 241 disposed in the upper end region, the (2-3)$^{th}$ guide line 243 disposed in the lower end region, and the (2-2)$^{th}$ guide line 242 disposed between the (2-1)$^{th}$ guide line 241 and the (2-3)$^{th}$ guide line 243.

According to an embodiment, the (2-1)$^{th}$ guide line 241 and the (2-3)$^{th}$ guide line 243 may be in contact with the guide groove 421a or 421b formed in the first cover 400 so as to help the second connection unit 202 to reciprocally slide without shaking when the second connection unit 202 is horizontally moved. As another example, the (2-2)$^{th}$ guide line 242 may be in contact with a guide groove or stopper (e.g., the stopper 422b) formed in the first cover 400 so as to provide a non-shaking horizontal movement while moving within a predetermined separation distance.

According to an embodiment, the $(2-1)^{th}$ guide line 241, the $(2-2)^{th}$ guide line 242, and the $(2-3)^{th}$ guide line 243 may have different widths and different lengths, and may be arranged to correspond to the first guide lines 211, 212, and 213, respectively. For example, the (2-1) guide line 241 may be disposed so as to be in contact with or so as to be spaced apart from the $(1-1)^{th}$ guide line 211 in response to the horizontal movement of the distance adjustment structure. As another example, the $(2-3)^{th}$ guide line 243 may be disposed so as to be in contact with or so as to be spaced apart from the $(1-3)^{th}$ guide line 213 in response to the horizontal movement of the distance adjustment structure. As another example, the $(2-2)^{th}$ guide line 242 and the $(1-2)^{th}$ guide line 212 may be disposed such that the separation distance between the $(2-2)^{th}$ guide line 242 and the $(1-2)^{th}$ guide line 212 is variable, but the $(2-2)^{th}$ guide line 242 and the $(1-2)^{th}$ guide line 212 are not brought into contact with each other in response to the horizontal movement of the distance adjustment structure. However, the number of the second guide lines 241, 242, and 243 is not limited to three. Through a design change, one first guide line or two or more first guide lines may be provided by adjusting the width and length thereof.

According to an embodiment, the second rear portion 250 may include at least one second protrusion 251 protruding rearwards. The second protrusion 251 may be coupled to the circular plate 500 so as to provide stable movement for the second connection unit 202. For example, the second protrusion 251 may move in the state of being inserted into and seated in a region of the spiral recess 511 formed in the circular plate 500. The second protrusion 251 may move in the horizontal direction (+P or −P) with respect to the first protrusion 221, and the second protrusion 251 may move in response to the rotation of the circular plate 500. The seated position of the second protrusion 251 in the spiral recess 511 may be variable.

According to an embodiment, the circular plate 500 may rotate clockwise or counterclockwise, and the second protrusion 251 seated in the spiral recess 511 may move in the circular plate 500 along the spiral recess 511. For example, when the circular plate 500 is rotated in the first direction (e.g., clockwise), the position of the second protrusion 251, which is seated in the spiral recess 511, is varied to the edge region from the center region of the circular plate 500 along the spiral recess 511, so that the separation distance of the second connection unit 202 with respect to the first connection unit 201 can be increased. As another example, when the circular plate 500 is rotated in the second direction (e.g., counterclockwise), the position of the second protrusion 251, which is seated in the spiral recess 511, is varied to the center region from the edge region of the circular plate 500 along the spiral recess 511, so that the separation distance of the second connection unit 202 with respect to the first connection unit 201 can be reduced.

According to an embodiment, the second protrusion 251 may be disposed on the second rear portion 250. For example, the second protrusion 251 may be disposed opposite the $(2-2)^{th}$ guide line 242 of the second front portion 240, and may be formed to have a thickness corresponding to the spiral recess 511 in the circular plate 500.

According to an embodiment, the second protrusion 251 may be spaced apart from the side end of the second rear portion 250 by the second distance L2. The second distance L2 may be the distance for the second protrusion 251 to be seated in the spiral recess 511 in the circular plate 500, and may be different from the first distance L1 by which the first protrusion 221 formed on the first connection unit 201 is spaced apart from the side end of the first rear portion 220. For example, the spiral recess 511 in the circular plate 500 may have a spiral shape, and the second protrusion 251 and the first protrusion 221 may be provided at positions that do not correspond to each other, so as to be seated in the recess shape. According to an embodiment, it is exemplified that one second protrusion 251 is provided on the second rear portion 250, but is not limited thereto. Through a design change, two or more second protrusions 251 may be provided in various shapes to be seated and supported in the spiral recess 511 in the circular plate 500.

According to various embodiments, the second connection unit 202 may include the second side portion 260 that is capable of being exposed toward the first housing 311, and the second side portion 260 may include at least one second recess 261. The second side portion 260 may be in contact with the first side portion 230 of the first connection unit 201 or may be spaced apart from the first side portion 230 of the first connection unit 201 depending on the distance adjustment between the second connection unit 202 and the first connection unit 201.

According to an embodiment, the opened second recess 261 formed in the second side portion 260 may be coupled to the first recess 231 in the first side portion 230 of the first connection unit 201 so as to form the single closed opening 203. The opening 203 may be disposed so as to penetrate through the first connection unit 201 and the second connection unit 202, and may provide a space into which the boss 611 formed in the second cover 600 is inserted. For example, the boss 611 of the second cover 600 may be coupled to the first cover 400 by passing through the through hole 530 in the center of the circular plate 500 and through the opening 203.

According to various embodiments, the first cover 400 may cover at least a portion of each of the first connection unit 201 and the second connection unit 202, and may guide the movements of the first connection unit 201 and the second connection unit 202. According to an embodiment, the first cover 400 may be manufactured to have an area capable of covering the front faces of the first connection unit 201 and the second connection unit 202 at the same time. As another example, the first cover 400 may be manufactured to have an area capable of covering at least portions of the upper end regions and/or at least portions of the lower end regions of the first connection unit 201 and the second connection unit 202 at the same time.

According to an embodiment, the first cover 400 may include a first face 410 exposed to the outside of the electronic device 101, a second face 420 facing the first connection unit 201 and the second connection unit 202, and a side face 430 protruding rearwards from the first face 410. The first face 410 may cover the first connection unit 201 and the second connection unit 202 such that at least a portion of the first connection unit 201 and at least a portion of the second connection unit 202 are not exposed to the outside. The second face 420 may include at least one guide groove 421*a*, and 421*b*, and stopper 422*a*, or 422*b* recessed toward the first face 410.

According to an embodiment, a plurality of guide grooves 421*a* and 421*b* may be formed in the second face 420. For example, the first guide groove 421*a* may be formed in an upper end region of the second face 420, and the second guide groove 421*b* may be formed in a lower end region of the second face 420. As another example, a third guide groove or stopper 422a or 422b may be disposed between the first guide groove 421a and the second guide groove 421b.

According to an embodiment, the first guide groove 421a is formed in a size capable of covering the $(1\text{-}1)^{th}$ guide line 211 of the first connection unit 201 and the $(2\text{-}1)^{th}$ guide line 241 of the second connection unit 202 in unison. For example, a portion of the first guide groove 421a is in contact with the $(1\text{-}1)^{th}$ guide line 211 to help the first connection unit 201 to reciprocally slide without shaking when the first connection unit 201 is horizontally moved. As another example, another portion of the first guide groove 421a is in contact with the (2-1) guide line 241 to help the second connection unit 202 to reciprocally slide without shaking when the second connection unit 202 is horizontally moved.

According to an embodiment, the second guide groove 421b is formed in a size capable of covering the $(1\text{-}3)^{th}$ guide line 213 of the first connection unit 201 and the $(2\text{-}3)^{th}$ guide line 243 of the second connection unit 202 in unison. For example, a portion of the second guide groove 421b is in contact with the $(1\text{-}3)^{th}$ guide line 213 to help the first connection unit 201 to reciprocally slide without shaking when the first connection unit 201 is horizontally moved. For example, a portion of the second guide groove 421b is in contact with the $(2\text{-}3)^{th}$ guide line 243 to help the second connection unit 202 to reciprocally slide without shaking when the second connection unit 202 is horizontally moved.

According to an embodiment, a plurality of third guide grooves (e.g., the stoppers 422a and 422b) may be provided in the second face 420 and may be arranged on the same line. The third guide grooves (e.g., the stoppers 422a and 422b) may help the $(1\text{-}2)^{th}$ guide line 212 and/or the $(2\text{-}2)^{th}$ guide line 242 to reciprocally slide without shaking when the $(1\text{-}2)^{th}$ guide line 212 and/or the $(2\text{-}2)^{th}$ guide line 242 are horizontally moved. As another example, the third guide grooves (e.g., the stoppers 422a and 422b) may serve as stoppers. For example, the stoppers 422a and 422b may include the first stopper 422a and the second stopper 422b, which are spaced apart from each other in the center region of the second face 420. The first stopper 422a and the second stopper 422b may have a smaller length than the first guide groove 421a or the second guide groove 421b.

According to an embodiment, the first stopper 422a may be formed at a position corresponding to the $(1\text{-}2)^{th}$ guide line 212 of the first connection unit 201 and may be fabricated in a closed groove shape so as to limit the horizontal movement of the $(1\text{-}2)^{th}$ guideline 212. As another example, the second stopper 422b may be formed at a position corresponding to the $(2\text{-}2)^{th}$ guide line 242 of the second connection unit 202 and may be fabricated in a closed groove shape so as to limit the horizontal movement of the $(2\text{-}2)^{th}$ guideline 242.

According to an embodiment, the side face 430 of the first cover 400 covers at least a portion of the upper or lower end region of the first connection unit 201 and the second connection unit 202 together with the second cover 600. The side surface 430 at the upper end of the first cover 400 may include a curved recess 431 for allowing the user to easily touch a portion of the circular plate 500 exposed to the upper end.

Figure 8:
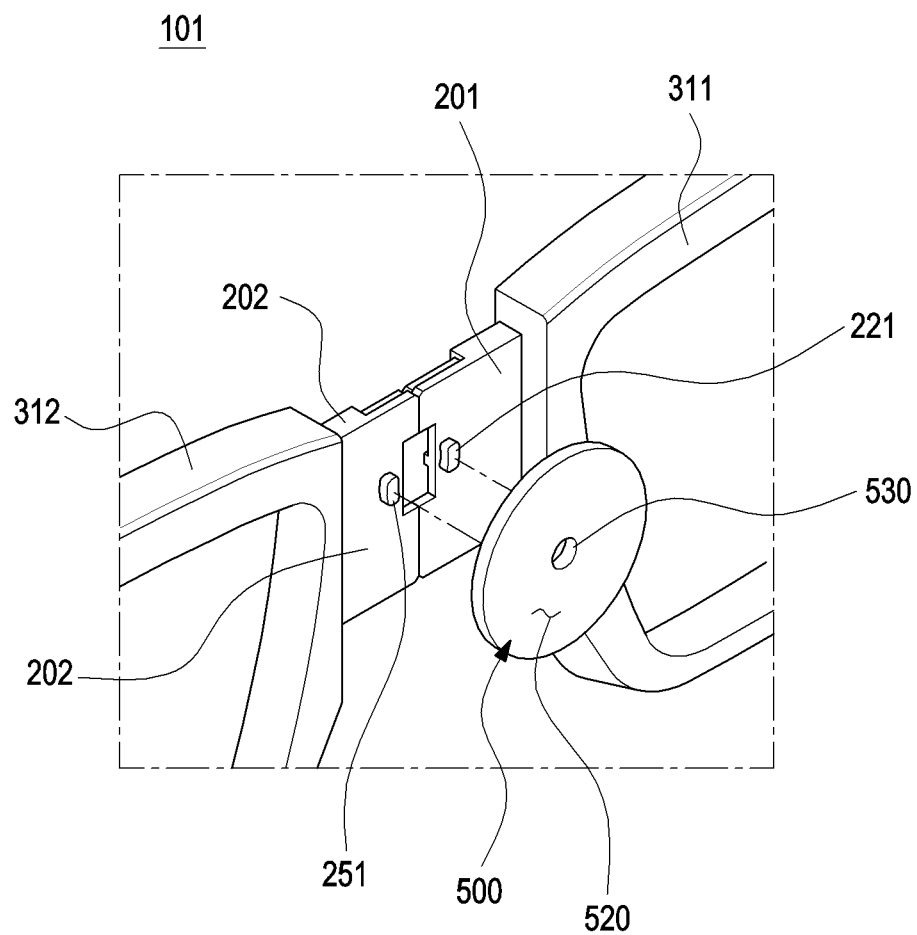
FIG. 8 is a perspective view illustrating a rear side of first and second connection units and a circular plate of a wearable electronic device according to an embodiment of the disclosure.
Figure 10:
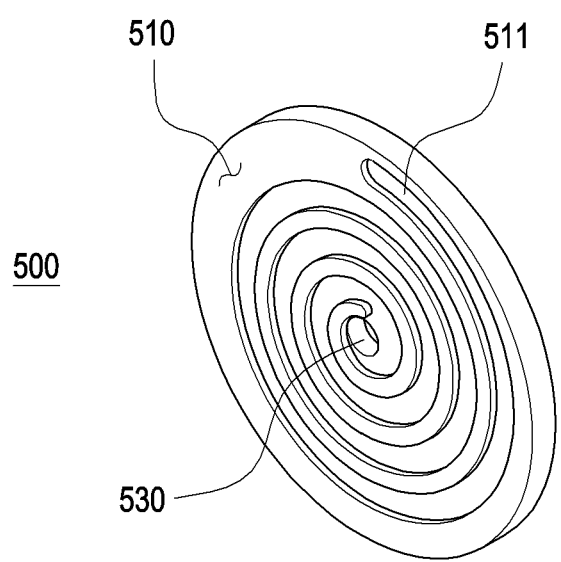
FIG. 10 is a perspective view illustrating one side of a circular plate according to an embodiment of the disclosure.

FIG. 8 is a perspective view illustrating a rear side of first and second connection units and a circular plate of a wearable electronic device according to various embodiments of the disclosure. FIG. 9 is a projection view illustrating a circular plate coupled to first and second connection units of a wearable electronic device according to various embodiments of the disclosure. FIG. 10 is a perspective view illustrating one side of a circular plate according to various embodiments of the disclosure.

Referring to FIGS. 8 to 10, the electronic device 101 may include the first housing 311 including the first connection unit 201, the second housing 312 including the second connection unit 202, the first cover 400, and the circular plate 500. The structure of the electronic device 101 of FIGS. 8 to 10 may be partly or wholly the same as the structure of the electronic device 101 of FIGS. 5 to 7.

According to various embodiments, the first connection unit 201 and the second connection unit 202 may be disposed so as to face each other, and may be guided by the circular plate 500 to move in the horizontal direction (+P or −P). For example, the first connection unit 201 and the second connection unit 202 may move so as to be spaced apart from each other in the horizontal direction (or in different movement directions), and the separation distance therebetween may be 0 to 20 mm.

According to various embodiments, the circular plate 500 includes the first face 510 disposed so as to face the front side, the second face 520 disposed so as to face the rear side and so as to have the same area as the first face 510, and the through hole 530 passing through the center of the circular plate 500. The first face 510 of the circular plate 500 may face the first cover (e.g., the first cover 400 in FIG. 3) across the first connection unit 201 and the second connection unit 202 therebetween and the second face 520 may face the second cover (e.g., the second cover 600 in FIG. 3).

According to an embodiment, the first face 510 of the circular plate 500 may include the spiral recess 511. The spiral recess 511 may be made to have a depth and a width corresponding to the first protrusion 221 and second protrusion 251, and may allow the first protrusion 221 and the second protrusion 251 to stably move when the first protrusion 221 and the second protrusion 251 rotate along the recess.

According to an embodiment, a first region S1 of the spiral recess 511 may be engaged with the first protrusion 221, and a second region S2 of the spiral recess 511, which is spaced apart from the first region S1 by a predetermined interval, may be engaged with the second protrusion 251. For example, the circular plate 500 may be configured such that, by the rotation of the circular plate 500, the first protrusion 221 and the second protrusion 251 may move in the predetermined direction along the spiral recess 511 such that the first predetermined interval may be changed to the second predetermined interval. Depending on the second predetermined interval, the distance between the first housing 311 and the second housing 312 may be adjusted.

According to various embodiments, the first region S1 and the second region S2 of the spiral recess 511 may vary in response to the rotation of the circular plate 500. According to an embodiment, the circular plate 500 may rotate clockwise or counterclockwise, and the first region S1 corresponding to the first protrusion 221 may move in the circular plate 500 along the spiral recess 511. For example, when the circular plate 500 is rotated in the first direction (e.g., clockwise), the position of the first region S1 corresponding to the first protrusion 221 is varied to the edge region from the center region of the circular plate 500 along the spiral recess 511, so that the separation distance of the first connection unit 201 with respect to the second connection unit 202 can be increased. As another example, when the circular plate 500 is rotated in the second direction (e.g., counterclockwise), the position of the first region S1 corresponding to the first protrusion 221 is varied to the center region from the edge region of the circular plate 500 along the spiral recess 511, so that the separation distance of the first connection unit 201 with respect to the second connection unit 202 can be reduced. According to an embodiment, the circular plate 500 may rotate clockwise or counterclockwise, and the second region S2 corresponding to the second protrusion 251 may move in the circular plate 500 along the spiral recess 511. For example, when the circular plate 500 is rotated in the first direction (e.g., clockwise), the position of the second region S2 corresponding to the second protrusion 251 is varied to the edge region from the center region of the circular plate 500 along the spiral recess 511, so that the separation distance of the second connection unit 202 with respect to the first connection unit 201 can be increased. As another example, when the circular plate 500 is rotated in the second direction (e.g., counterclockwise), the position of the second region S2 corresponding to the second protrusion 251 is varied to the center region from the edge region of the circular plate 500 along the spiral recess 511, so that the separation distance of the second connection unit 202 with respect to the first connection unit 201 can be reduced.

According to an embodiment, the first region S1 and the second region S2 of the circular plate 500 may be disposed at different distances from the through hole 530 of the circular plate 500. For example, since the spiral recess 511 does not have regions disposed at the same distance from the through hole 530, the first region S1 and the second region S2, which are varied by rotation, are always disposed at different positions, thereby forming different separation distances from the through hole 530.

According to various embodiments, the second face 520 of the circular plate 500 may be flat, and may be seated on the seating face of the second cover 600. As another example, a portion of the circular plate 500 may be exposed through an opening disposed in the upper direction of the second cover 600, and the user may touch the circular plate 500 with a finger so as to rotate the circular plate 500. According to an embodiment, the spiral recess 511 or circular plate 500 may further include detents or other friction features (not shown) such that a position of the first protrusion 221 and the second protrusion 251 is firmly maintained after user release of the circular plate 500.

According to various embodiments, the through hole 530 in the circular plate 500 may disposed on the same line as the center of the boss 611 of the second cover, and may be prevented from breaking away therefrom upon rotation.

Figure 11:
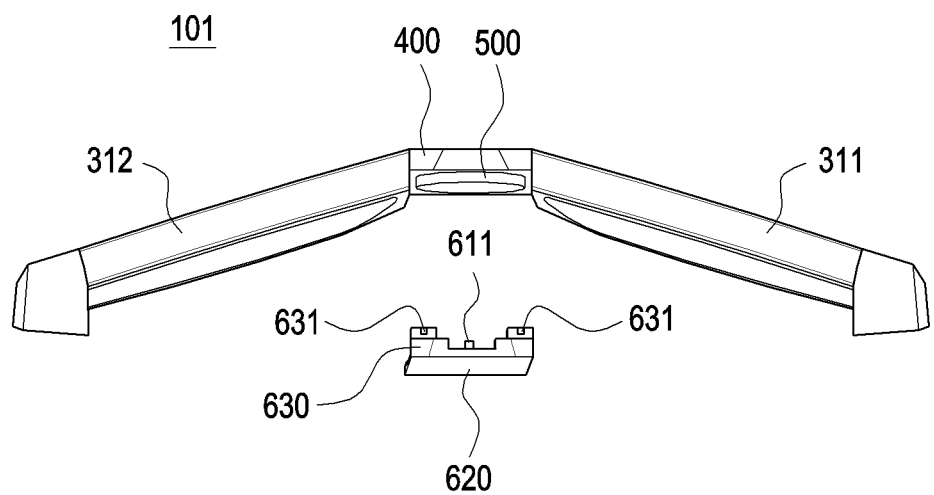
FIG. 11 is a top view illustrating a second cover capable of being coupled to a first cover of a wearable electronic device according to an embodiment of the disclosure.
Figure 12:
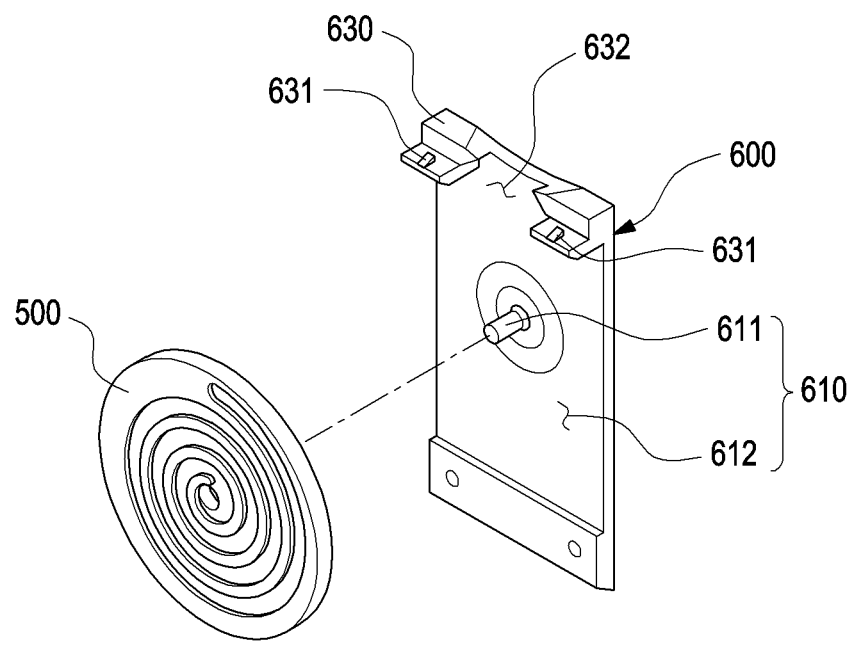
FIG. 12 is an exploded perspective view illustrating a circular plate capable of being coupled to a second cover of a wearable electronic device according to an embodiment of the disclosure.

FIG. 11 is a top view illustrating a second cover capable of being coupled to a first cover of a wearable electronic device according to various embodiments of the disclosure. FIG. 12 is an expanded perspective view illustrating a circular plate capable of being coupled to a second cover of a wearable electronic device according to various embodiments of the disclosure.

Referring to FIGS. 11 and 12, the electronic device 101 may include the first housing 311 including a first connection unit (e.g., the first connection unit 201 in FIG. 8), the second housing 312 including a second connection unit (e.g., the second connection unit 202 in FIG. 8), the first cover 400, the circular plate 500, and the second cover 600. The structure of the electronic device 101 of FIGS. 11 and 12 may be partly or wholly the same as the structure of the electronic device 101 of FIGS. 2 to 7.

According to various embodiments, the second cover 600 may cover the first connection unit 201, at least a portion of the second connection portion 202, and the circular plate 500 and may support the rotational movement of the circular plate 500. The second cover 600 may be formed to have an area corresponding to that of the first cover 400.

According to an embodiment, the second cover 600 may include a first face 610 facing the circular plate 500, a second face 620 exposed to the outside of the electronic device 101, and a side face 630 protruding forwards from the second face 620. The first face 610 may cover the circular plate 500 such that at least a portion of the circular plate 500 is not exposed to the outside. The second face 620 may include the boss 611 protruding toward the first face 610, and the side surface 630 may include the hook or hooks 631 capable of engaging with the first cover 400.

According to an embodiment, the first face 610 may include a seating face 612 on which the circular plate 500 is capable of being seated, and the boss 611 may be fitted to the through hole 530 in the circular plate 500. The circular plate 500 coupled to the boss 611 may rotate clockwise or counterclockwise about the boss 611 as a rotation axis. According to an embodiment, the boss 611 may pass through the through hole 530 in the circular plate 500 to be connected to the opened or closed opening formed by the first connection unit 201 and the second connection part 202. For example, the center of the boss 611 of the second cover 600 may be located on the same line as the center of the through hole 530 in the circular plate 500 and the centers of the openings of the first connection unit 201 and the second connection unit 202.

According to an embodiment, the side face 630 may protrude from the first face 610 to the front side, and at least one hook 631 may be disposed at the end thereof. The hook 631 may face the side face of the first cover 400 to be fitted thereto. As another example, the center region of the side face 630 may be provided with an opening 632, and the circular plate 500 may be exposed to the outside through the opening 632. At least a portion of the exposed circular plate 500 may be rotated by a user using a finger or the like.

Figure 13:
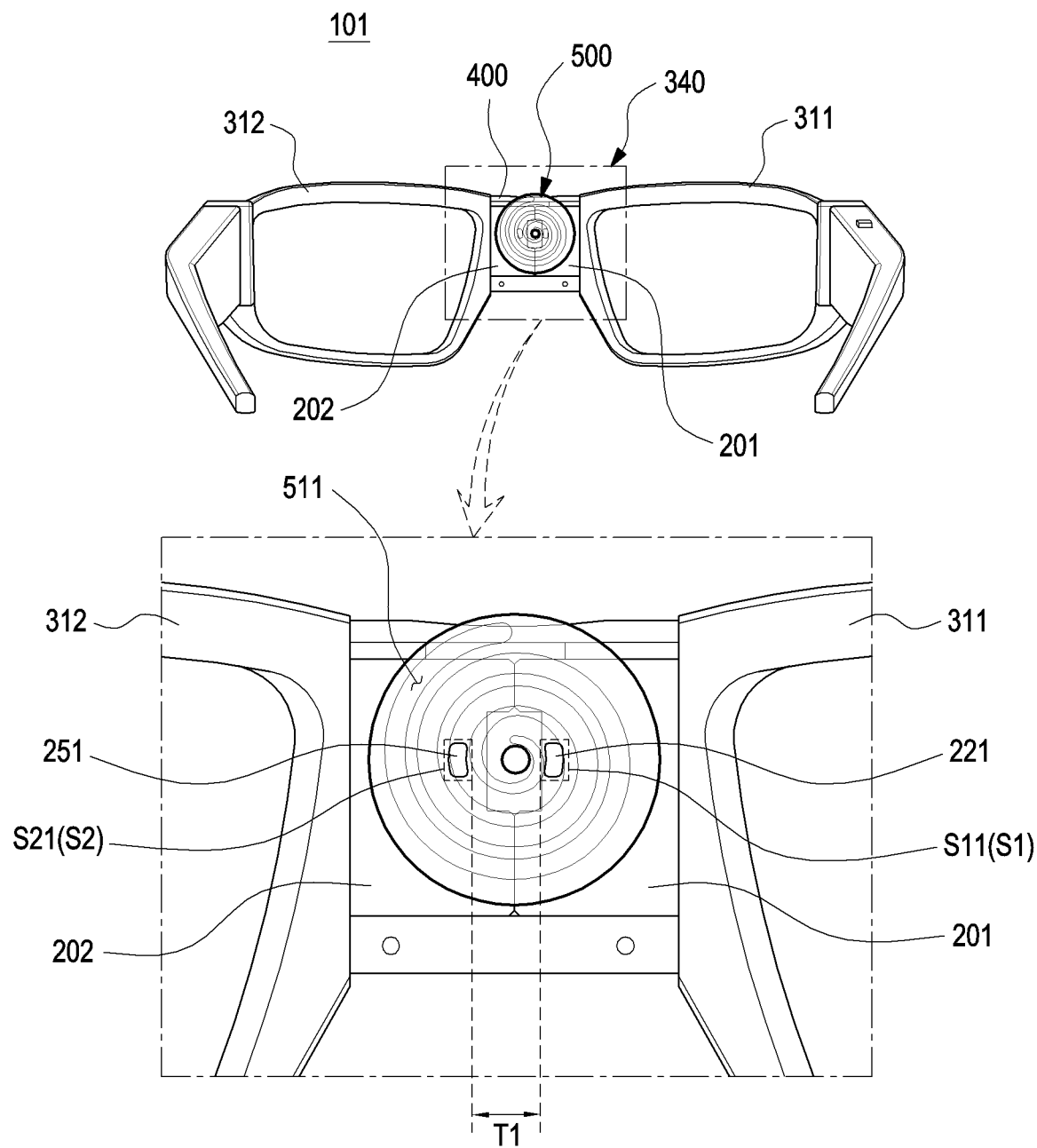
FIG. 13 is an enlarged view illustrating a first state prior to operation of a distance adjustment structure of a wearable electronic device according to an embodiment of the disclosure and the distance adjustment structure.
Figure 14:
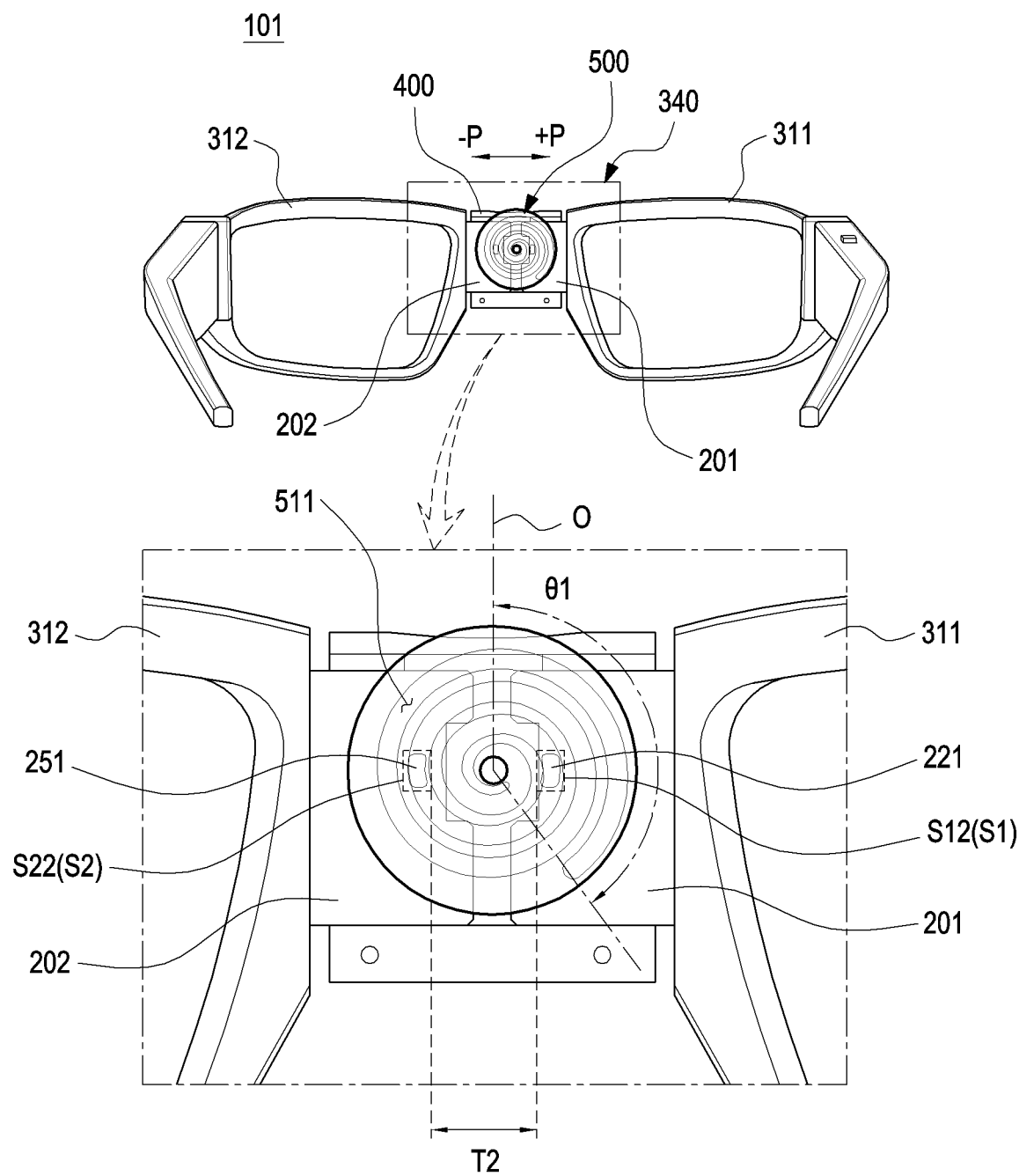
FIG. 14 is an enlarged view illustrating a second state in which a length is varied through a distance adjustment structure of a wearable electronic device according to an embodiment of the disclosure and the distance adjustment structure.
Figure 15:
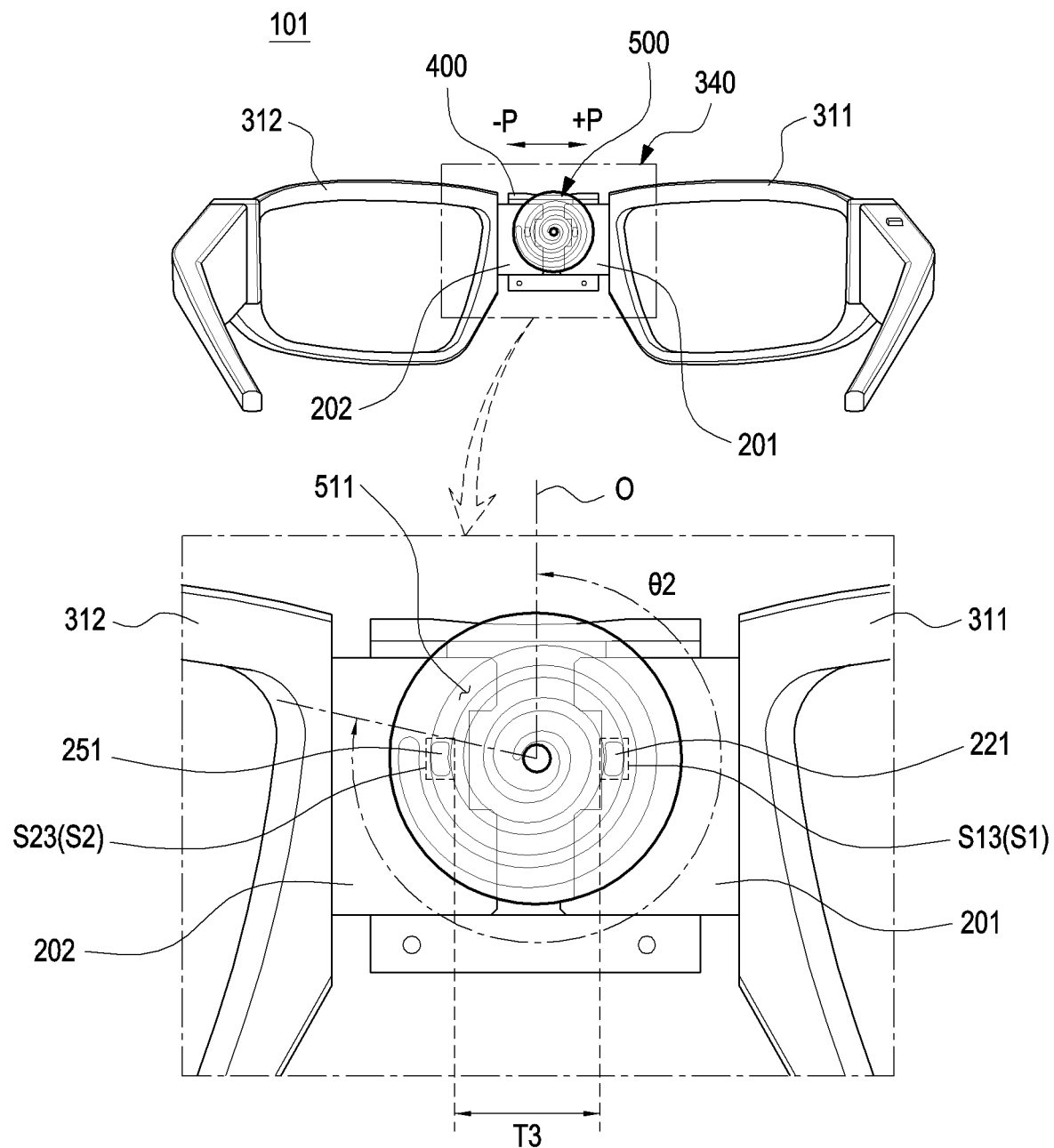
FIG. 15 is an enlarged view illustrating a third state in which a length is varied through a distance adjustment structure of a wearable electronic device according to an embodiment of the disclosure and the distance adjustment structure.

FIG. 13 is an enlarged view illustrating a first state prior to operation of a distance adjustment structure of a wearable electronic device according to various embodiments and distance adjustment structure. FIG. 14 is an enlarged view illustrating a second state in which a length is varied through a distance adjustment structure of a wearable electronic device according to various embodiments and distance adjustment structure. FIG. 15 is an enlarged view illustrating a third state in which a length is varied through a distance adjustment structure of a wearable electronic device according to various embodiments and distance adjustment structure.

Referring to FIGS. 13 to 15, the wearable electronic device 101 may include the distance adjustment structure 340, which may include the first housing 311 including the first connection unit 201, the second housing 312 including the second connection unit 202, the first cover 400, and the circular plate 500. FIGS. 13 to 15 show projection views in order to clearly illustrate the operation state, in which the structure from which the second cover 600 is excluded and the spiral recess 511 in the circular plate 500 are shown. The structure of the electronic device 101 of FIGS. 13 to 15 may be partly or wholly the same as the structure of the electronic device 101 of FIGS. 2 to 12.

According to various embodiments, in the electronic device 101, the first housing 311 and the second housing 312 may be spaced apart from each other as the circular plate 500 rotates. For example, the first connection unit 201 and the second connection unit 202 may move so as to be spaced apart from each other in the horizontal direction (+P or −P)

(or in different movement directions), and the separation distance therebetween may be 0 to 20 mm.

According to an embodiment, the first housing 311 may include the first connection unit 201 extending toward the second housing 312, and the second housing 312 may include the second connection unit 202 extending toward the first housing 311. The circular plate 500 may include the spiral recess 511.

According to an embodiment, the end of the first connection unit 201 and the end of the second connection unit 202 may be in contact with each other or may be spaced apart from each other. The first protrusion 221 formed on the first connection unit 201 may be disposed in the first region S1 of the spiral recess 511, and the second protrusion 251 may be disposed in the second region S2 of the spiral recess 511, which is spaced apart from the first region S1 by a first predetermined interval T1. The first region S1 and the second region S2 of the spiral recess 511 may be varied by rotation. For example, the first region S1 is a region where the first protrusion 221 is disposed, and may be varied to a $(1-1)^{th}$ region S11, a $(1-2)^{th}$ region S12, and a $(1-3)^{th}$ region S13 depending on the rotation of the circular plate 500. As another example, the second region S2 is a region where the second protrusion 251 is disposed, and may be varied to a $(2-1)^{th}$ region S21, a $(2-2)^{th}$ region S22, and a $(2-3)^{th}$ region S23 depending on the rotation of the circular plate 500.

Referring to FIG. 13, the first housing 311 and the second housing 312 are in the state in which they are not spaced apart from each other. The first protrusion 221 formed on the first connection unit 201 may be disposed in the $(1-1)^{th}$ region S11 of the spiral recess 511, and the second protrusion 251 may be disposed in the $(2-1)^{th}$ region S21 of the spiral recess 511.

Referring to FIG. 14, the first housing 311 and the second housing 312 may be spaced apart from each other by the rotation of the circular plate 500. For example, the distance between the first protrusion 221 of the first connection unit 201 and the second protrusion 251 of the second connection unit 202 may be varied from the first predetermined interval T1 of FIG. 13 to a second predetermined interval T2. The second predetermined interval T2 may be larger than the first predetermined interval T1.

According to an embodiment, the circular plate 500 is rotatable, and in response to the rotation of the circular plate 500, the regions in the spiral recess 511 in which the first protrusions 221 and the second protrusions 251 are seated is variable. For example, the circular plate 500 may be rotated clockwise by a first angle θ1 about a reference axis O, compared with FIG. 13. In response to this, the first protrusion 221 formed on the first connection unit 201 may be disposed in the $(1-2)^{th}$ region S12 of the spiral recess 511, and the second protrusion 251 may be disposed in the $(2-2)^{th}$ region S22 of the spiral recess 511. As another example, the first protrusion 221 and the second protrusion 251 may move in the horizontal direction (+P or –P).

Referring to FIG. 15, the first housing 311 and the second housing 312 may be somewhat more spaced apart from each other by the rotation of the circular plate 500, compared with FIG. 14. For example, the distance between the first protrusion 221 of the first connection unit 201 and the second protrusion 251 of the second connection unit 202 may be varied from the second predetermined interval T2 of FIG. 14 to a third predetermined interval T3. The third predetermined interval T3 may be larger than the second predetermined interval T2.

According to an embodiment, the circular plate 500 is rotatable, and in response to the rotation of the circular plate 500, the regions in the spiral recess 511 in which the first protrusions 221 and the second protrusions 251 are seated is variable. For example, the circular plate 500 may be rotated clockwise by a second angle θ2 about the reference axis O, compared with FIG. 13. In response to this, the first protrusion 221 formed on the first connection unit 201 may be disposed in the $(1-3)^{th}$ region S13 of the spiral recess 511, and the second protrusion 251 may be disposed in the $(2-3)^{th}$ region S23 of the spiral recess 511. As another example, the first protrusion 221 and the second protrusion 251 may move in the horizontal direction (+P or –P).

The length of each of the first connection unit 201 and the second connection unit 202 connected to the display devices can be adjusted through the interval adjustment structure, and can be corrected depending on the size of the user's head. Thus, it is possible to prevent warping of an optical path provided in an optical output device such as a projector, to prevent warping of a connection portion between display devices, and to eliminate side effects such as phase distortion and dizziness.

Figure 16:
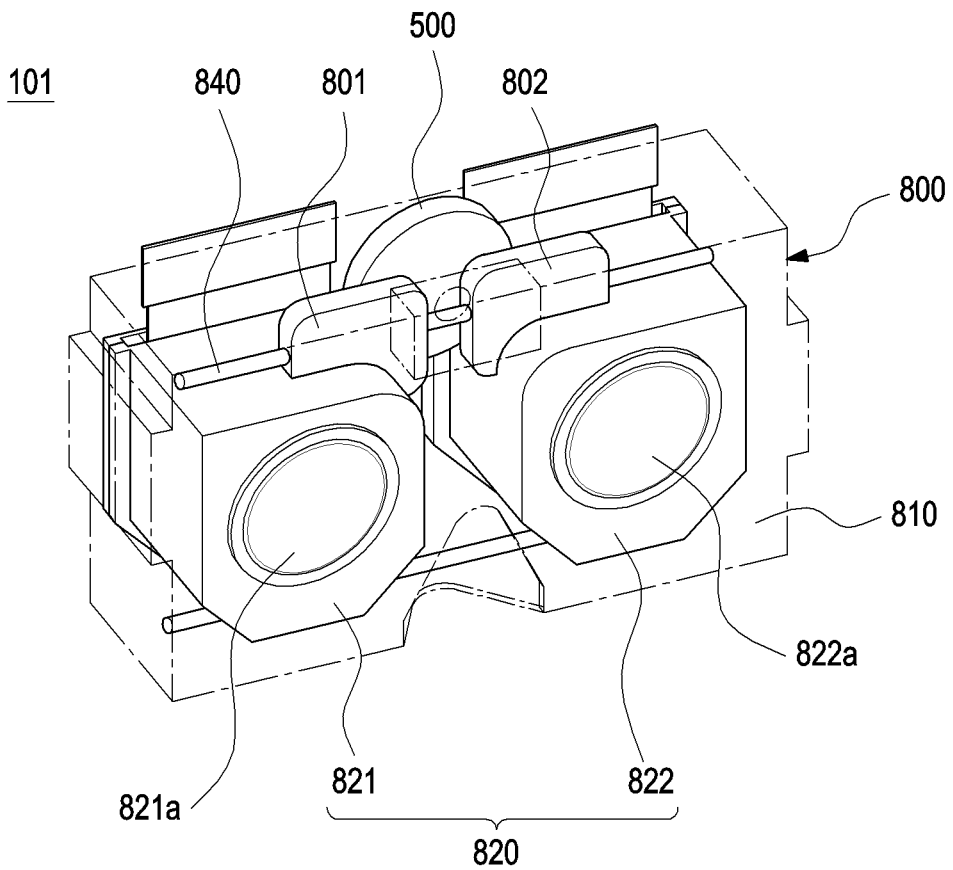
FIG. 16 is a perspective view illustrating a wearable electronic device according to an embodiment of the disclosure, which is equipped with a distance adjustment structure.
Figure 17:
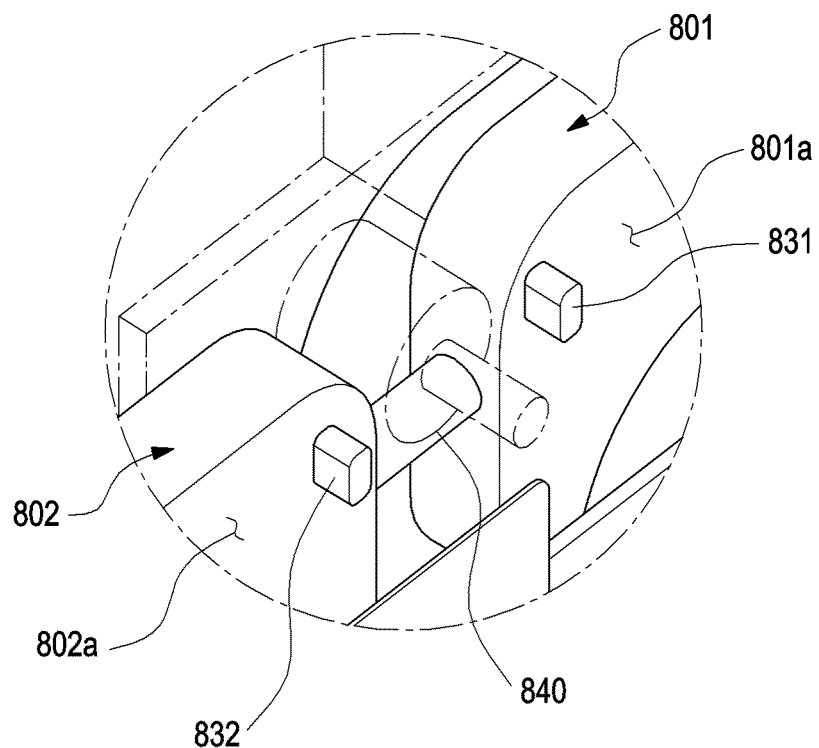
FIG. 17 is an enlarged view in which a part of a rear side of a distance adjustment structure according to an embodiment of the disclosure is enlarged.
Figure 18:
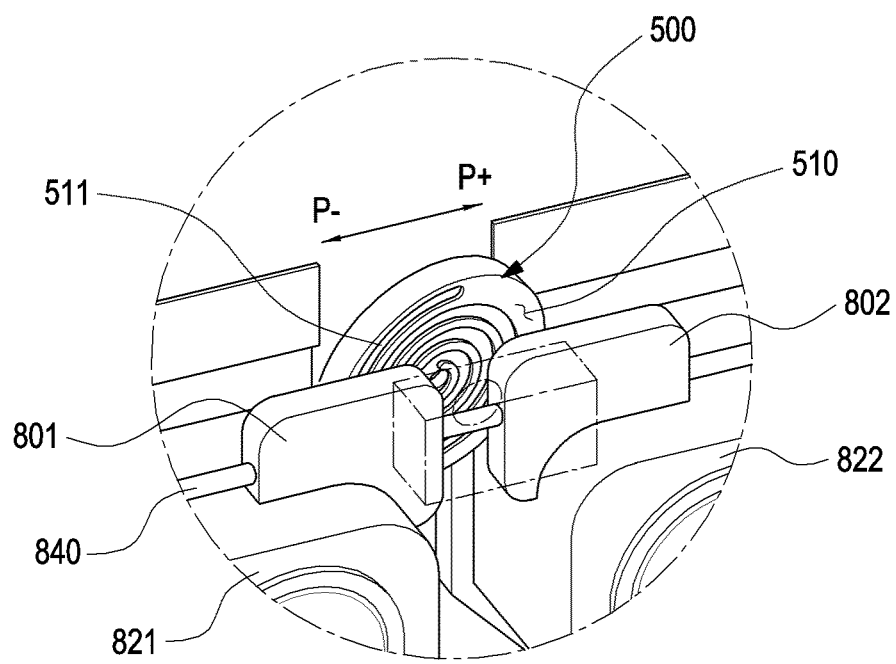
FIG. 18 is an enlarged view in which a part of a front side of a distance adjustment structure according to an embodiment of the disclosure is enlarged.

FIG. 16 is a perspective view illustrating a wearable electronic device according to another embodiment of the disclosure, which is equipped with a distance adjustment structure. FIG. 17 is an enlarged view in which a part of a rear side of a distance adjustment structure according to an embodiment of the disclosure is enlarged. FIG. 18 is an enlarged view in which a part of a front side of a distance adjustment structure, according to an embodiment of the disclosure, is enlarged.

Referring to FIGS. 16 to 18, the electronic device 101, according to various embodiments of the disclosure, may be a virtual-reality-related device, and may include a face mount unit 800 configured to be worn on the user's face. The face mount unit 800 of the electronic device 101 may include a display panel (not illustrated) disposed in a cover unit 810, a display panel (not shown) disposed in the cover unit 810, lens barrels 821 and 822, and a distance adjustment structure 801, 802, 840, or 500.

According to various embodiments, in the worn state, the electronic device 101 may be positioned to correspond to the user's face (e.g., both eyes). According to an embodiment, the electronic device 101 may output an image to both eyes of the user. For example, the electronic device 101 may include a display panel or an optical device, in which the optical device may include lens barrels 820 corresponding to the user's eyes, so that the user's left and right eyes can recognize images which are output from the display panel through respective independent paths (e.g., respective lens barrels).

According to various embodiments, a configuration in which the display panel of the electronic device 101 is incorporated is disclosed, but the disclosure is not limited thereto. For example, the electronic device 101 may not include a display panel, and an external device equipped with a display device, such as a mobile communication terminal, may be detachably provided in the electronic device 101. In an embodiment, when the external device is mounted, a display device (e.g., a display device mounted on the electronic device) may be positioned to face both of the user's eyes with the optical device interposed therebetween. The external device may reproduce a multimedia content therein (or received from an external electronic device) or the like or may execute a game, and an output screen may be provided to both of the user's eyes through the optical device.

According to an embodiment, the optical device may be mounted on a display panel, and may include the pair of lens barrels 821 and 822, and at least one lens 821a or 822a mounted on each of the lens barrels 821 and 822. The types and the number of the lenses 821a and 822a provided in the lens barrel 821 or 822 are variously designed and combined in consideration of the distance between the user's eyes and the display panel (or the display device of the mounted electronic device). According to an embodiment, each of the lens barrels 820 may be arranged to correspond to both the user's left and right eyes, and may guide images output from the display panel to the user's eyes.

According to various embodiments, the user may wear the wearable electronic device 101, and may adjust the distance between the eyes through the distance adjustment structure depending on the size of the user's head. The distance adjustment structure of the electronic device 101 may include the first connection unit 801, the second connection unit 802, the circular plate 500, and the guide member 840. The structures of the first connection unit 801, the second connection unit 802, and the circular plate 500 of the electronic device 101 of FIGS. 16 and 18 may be partially or wholly the same as the structures of the electronic device 101 of FIG. 1 and the connection unit 201, the second connection unit 202, and the circular plate 500 of FIGS. 2 to 12.

According to various embodiments, the first connection unit 801 and the second connection unit 802 may be disposed so as to face each other, and may be guided by the circular plate 500 and the guide member 840 to move in the horizontal direction (+P or –P). For example, the first connection unit 801 and the second connection unit 802 may move so as to be spaced apart from each other in the horizontal direction (+P or –P) from the state in which one face of the connection unit 801 and one face of the second connection unit 802 are disposed to be in contact with each other, and the separation distance therebetween may be 0 to 20 mm.

According to various embodiments, the first connection unit 801 may be disposed so as to at least partially extend from the end of the lens barrel 821 (e.g., the first housing) toward the second lens barrel 822 (e.g., the second housing), and may include at least one protrusion (e.g., a first protrusion 831). The second connection unit 802 may be disposed so as to at least partially extend from the end of the second lens barrel 822 toward the first lens barrel 821, and may include at least one protrusion (e.g., a second protrusion 832). According to an embodiment, the guide member 840 may be disposed so as to pass through the first connection unit 801 and the second connection unit 802, and may have a shaft structure.

According to various embodiments, the first connection unit 801 and the second connection unit 802 may be disposed so as to be in contact with or to be spaced apart from each other, and one face of each of the first connection unit 801 and the second connection unit 802 may support the circular plate 500.

According to various embodiments, the circular plate 500 may include the first face 510 disposed so as to face the first connection unit 801 and the second connection unit 802. For example, the first face 510 may include the spiral recess 511, and may include a region capable of engaging with the first protrusion 831 of the first connection unit 801 and the second protrusion 832 of the second connection unit 802. The structure of the circular plate 500 of FIG. 10 may be applicable to the specific configuration of the circular plate 500.

According to various embodiments, the guide member 840 may be disposed so as to pass through the first connection unit 801, to be connected to the second connection unit 802, and to pass through the second connection unit 802. When the separation distance between the first connection unit 801 and the second connection unit 802 is variable, the guide member 840 may guide the first connection unit 801 and the second connection unit 802 to be movable in the horizontal direction (+P or –P).

According to an embodiment, a first rear portion 801a disposed to face the rear side of the first connection unit 801 may include at least one first protrusion 831 protruding to the rear side. The first protrusion 831 may be coupled to the circular plate 500 so as to provide stable movement for the first connection unit 801. For example, the first protrusion 831 may move in the state of being inserted into and seated in a region of the spiral recess 511 formed in the circular plate 500. The first protrusion 831 may move in the horizontal direction with respect to the second protrusion 832, and the circular plate 500 may rotate in response to the movement of the first protrusion 831. The seated position of the first protrusion 831 in the spiral recess 511 may be variable.

According to an embodiment, the circular plate 500 may rotate clockwise or counterclockwise, and the first protrusion 831 seated in the spiral recess 511 may move in the circular plate 500 along the spiral recess 511. For example, when the circular plate 500 is rotated in the first direction (e.g., clockwise), the position of the first protrusion 831, which is seated in the spiral recess 511, is varied to the edge region from the center region of the circular plate 500 along the spiral recess 511, so that the separation distance of the first connection unit 201 with respect to the second connection unit 202 can be increased. As another example, when the circular plate 500 is rotated in the second direction (e.g., counterclockwise), the position of the first protrusion 831, which is seated in the spiral recess 511, is varied to the center region from the edge region of the circular plate 500 along the spiral recess 511, so that the separation distance of the first connection unit 201 with respect to the second connection unit 202 can be reduced.

According to an embodiment, a second rear portion 802a disposed to face the rear side of the second connection unit 802 may include at least one second protrusion 832 protruding to the rear side. The second protrusion 832 may be coupled to the circular plate 500 so as to provide stable movement for the second connection unit 802. For example, the second protrusion 832 may move in the state of being inserted into and seated in a region of a spiral recess 511 formed in the circular plate 500. The second protrusion 832 may move in the horizontal direction with respect to the first protrusion 831, and the circular plate 500 may rotate in response to the movement of the second protrusion 832. The seated position of the second protrusion 832 in the spiral recess 511 may be variable.

According to an embodiment, the circular plate 500 may rotate clockwise or counterclockwise, and the second protrusion 832 seated in the spiral recess 511 may move in the circular plate 500 along the spiral recess 511. For example, when the circular plate 500 is rotated in the first direction (e.g., clockwise), the position of the second protrusion 832, which is seated in the spiral recess 511, is varied to the edge region from the center region of the circular plate 500 along the spiral recess 511, so that the separation distance of the second connection unit 202 with respect to the first connection unit 201 can be increased. As another example, when the circular plate 500 is rotated in the second direction (e.g., counterclockwise), the position of the second protrusion 832, which is seated in the spiral recess 511, is varied to the center region from the edge region of the circular plate 500 along the spiral recess 511, so that the separation distance of the second connection unit 202 with respect to the first connection unit 201 can be reduced.

According to various embodiments disclosed herein, a wearable electronic device may include a first housing (e.g., the first housing 311 in FIG. 3) including a first display device (e.g., the first display device 351 in FIG. 3) configured to provide visual information, and a first connection unit (e.g., the first connection unit 201 in FIG. 3) having a first protrusion (e.g., the first protrusion 221 in FIG. 4) formed thereon; a second housing (e.g., the second housing 312 in FIG. 3) including a second display device (e.g., the second display device 352 in FIG. 3) coupled to the first connection unit to be movable in a predetermined direction and configured to provide visual information, and a second connection unit (e.g., the second connection unit 202 in FIG. 3) having a second protrusion (e.g., the second protrusion 251 in FIG. 4) formed thereon; and a circular plate (e.g., the circular plate 500 in FIG. 3) including a spiral recess (e.g., the spiral recess 511 in FIG. 9), the circular plate being coupled to the first protrusion in a first region (e.g., the first region S1 in FIG. 9) of the recess and being coupled to the second protrusion in a second region (e.g., the second region S2 in FIG. 9) spaced apart from the first region by a first predetermined interval (e.g., the first predetermined interval T1 in FIG. 13). The circular plate may be configured such that, by the rotation of the circular plate, the first protrusion and the second protrusion move in a predetermined direction along the recess such that the first predetermined interval may be changed to a second predetermined interval (e.g., the second predetermined interval T2 in FIG. 14), and depending on the second predetermined interval, the distance between the first housing 311 and the second housing 312 is adjustable.

According to various embodiments, as lengths of the first region and the second region of the circular plate are varied, the first predetermined interval may be changed to the second predetermined interval.

According to various embodiments, a first distance (e.g., the first distance L1 in FIG. 9) may be formed from an end of the first connection unit, which faces the second housing, to the first protrusion, and a second distance (e.g., the second distance L2 in FIG. 9) may be formed from an end of the second connection unit, which faces the first housing, to the second protrusion. The first distance and the second distance may differ from each other.

According to various embodiments, the first protrusion and the second protrusion are disposed to be aligned with a predetermined axis, and as the distance between an end of the first housing and an end of the second housing is adjusted, the distance between the first display device and the second device is adjustable.

According to various embodiments, the change from the first predetermined interval to the second predetermined interval may be performed in a horizontal direction with respect to a length direction between the first protrusion and the second protrusion, which are disposed parallel or substantially parallel to each other.

According to various embodiments, the electronic device may further include a first cover (e.g., the first cover 400 in FIG. 4) facing a first face of the electronic device and disposed to enclose at least a portion of the first connection unit and the second connection unit. The first cover may include at least one guide groove (e.g., the guide groove 421a or 421b in FIG. 7) formed in one face facing the first connection unit or the second connection unit and configured to guide a movement of the first connection unit or the second connection unit; and a stopper (e.g., the stopper 422a or 422b in FIG. 7) disposed to be spaced apart from the guide groove and configured to limit the movement of the first connection unit or the second connection unit.

According to various embodiments, the first connection unit may include a first front portion (e.g., the first front portion 210 in FIG. 5) including at least one first guide line (e.g., the first guide line 211, 212, or 213 in FIG. 5) protruding toward the first face of the electronic device; a first rear portion (e.g., the first rear portion 220 in FIG. 6) including a first protrusion protruding toward a second face of the electronic device, which is opposite the first face of the electronic device; and a first side portion (e.g., the side portion 230 in FIG. 5) disposed to face the second housing, and having a first recess (e.g., the first recess 231 in FIG. 5) formed in at least a portion thereof.

According to various embodiments, the first guide line may include a $(1\text{-}1)^{th}$ guide line (e.g., the $(1\text{-}1)^{th}$ guide line 211 in FIG. 5) disposed in an upper end region or a lower end region of the first front portion, and engaged with the guide groove of the first cover so as to guide a slide movement of the first connection unit in a predetermined direction; and a $(1\text{-}2)^{th}$ guide line (e.g., the $(1\text{-}2)^{th}$ guide line 212 in FIG. 5) disposed to be spaced apart from the $(1\text{-}1)^{th}$ guide line, and engaged with the stopper of the first cover so as to limit a movement distance of the first connection unit.

According to various embodiments, the second connection unit may include a second front portion (e.g., the second front portion 240 in FIG. 5) including at least one second guide line (e.g., the second guide line 241, 242, or 243 in FIG. 5) protruding toward the first face of the electronic device; a second rear portion (e.g., the second rear portion 250 in FIG. 6) including a second protrusion protruding toward a second face of the electronic device, which is opposite the first face of the electronic device; and a second side portion (e.g., the side portion 260 in FIG. 5) disposed to face the first housing, and having a second recess (e.g., the second recess 261 in FIG. 5) formed in at least a portion thereof.

According to various embodiments, the second guide line may include a $(2\text{-}1)^{th}$ guide line (e.g., the $(2\text{-}1)^{th}$ guide line 241 in FIG. 5) disposed in an upper end region or a lower end region of the second front portion, and engaged with the guide groove of the first cover so as to guide a slide movement of the second connection unit in a predetermined direction; and a $(2\text{-}2)^{th}$ guide line (e.g., the $(2\text{-}2)^{th}$ guide line 242 in FIG. 5) disposed to be spaced apart from the $(2\text{-}1)^{th}$ guide line, and engaged with the stopper of the first cover so as to limit a movement distance of the second connection unit.

According to various embodiments, the first recess of the first connection unit and the second recess of the second connection unit are coupled to each other so as to form an opening (e.g., the opening 203 of FIG. 3) of a closed line.

According to various embodiments, the circular plate and the first cover may be disposed so as to face each other across the first rear portion of the first connection unit and the second rear portion of the second connection unit therebetween, and the circular plate may include a through hole (e.g., the through hole 530 in FIG. 4) disposed in a center of the spiral recess and formed through the circular plate.

According to various embodiments, the spiral recess may extend with a constant width, and at least a portion of the circular plate may be disposed so as to be exposed to the outside the electronic device, thus allowing a user to touch and rotate at least a portion of the circular plate.

According to various embodiments, the electronic device may further include a second cover (e.g., the second cover 600 in FIG. 3) facing a first face of the electronic device and disposed to enclose at least a portion of the circular plate. The second cover may include a boss (e.g., the boss 611 in FIG. 12) disposed to pass through the circular plate and to extend toward the first cover; at least one hook (e.g., the hook 631 in FIG. 12) configured to be coupled with the first cover; and an opening (e.g., the opening 632 in FIG. 12) formed in at least a portion of the upper end region so as to expose at least a portion of the circular plate.

According to various embodiments, the boss of the second cover, the through hole in the circular plate, and a center of the opening formed by the first connection unit and the second connection unit may be arranged on the same line.

According to various embodiments disclosed herein, a wearable electronic device may include a first display device configured to provide visual information; a second display device disposed to be spaced apart from the first display device and configured to provide visual information; and a distance adjustment structure disposed between the first display device and the second display device, and configured to adjust the distance between the first display device and the second display device. The distance adjustment structure may include a first connection unit disposed to extend from the first display device toward the second display device and including a first protrusion disposed to protrude in a direction perpendicular to the extension direction; a second connection unit disposed to extend from the second display device toward the first display device and including a second protrusion disposed to protrude in a direction perpendicular to the extension direction; and a curved plate including a spiral recess such that the first protrusion and the second protrusion are seated in the recess in a state of being spaced apart from each other so as to provide a spiral movement. As the curved plate rotates, the distance between the first protrusion and the second protrusion disposed in the spiral recess may be varied.

According to various embodiments, a first distance is formed from an end of the first connection unit, which faces the second display device, to the first protrusion, and a second distance is formed from an end of the second connection unit, which faces the first display device, to the second protrusion. The first distance and the second distance may differ from each other.

According to various embodiments, one face of the first connection unit and one face of the second connection unit face each other, and as the curved plate rotates, the distance between the first connection unit and the second connection unit is adjustable from a first predetermined distance to a second predetermined distance.

According to various embodiments, the electronic device may further include a first cover facing a first face of the electronic device and disposed to enclose at least a portion of the first connection unit and the second connection unit. The first cover may include at least one guide groove formed in a front face portion of the first cover facing the first connection unit or the second connection unit and configured to guide a movement of the first connection unit or the second connection unit; and a stopper disposed to be spaced apart from the guide groove and configured to limit the movement of the first connection unit or the second connection unit.

According to various embodiments, the electronic device may further include a guide member (e.g., the shaft 840 in FIG. 16) having a shaft shape disposed to pass through the first connection unit and the second connection unit, and configured to guide the horizontal movement of the first connection unit and the second connection unit.

While the disclosure has been shown and described with reference to various embodiments thereof, it will be apparent to those skilled in the art that various changes in form and details may be made therein without departing from the spirit and scope of the disclosure as defined by the appended claims and the equivalents.

What is claimed is:

1. An electronic device comprising:
a first housing comprising a first display device and a first connection unit comprising a first protrusion;
a second housing comprising a second display device and a second connection unit comprising a second protrusion, the second housing being coupled to the first connection unit to be movable in a predetermined direction;
a circular plate comprising a spiral recess, the circular plate being coupled to the first protrusion in a first region of the spiral recess and being coupled to the second protrusion in a second region of the spiral recess spaced apart from the first region; and
a first cover facing a first face of the electronic device and disposed to enclose at least a portion of the first connection unit and the second connection unit,
wherein the circular plate is configured to be rotatable to move the first protrusion and the second protrusion such that, by rotation of the circular plate, the first protrusion and the second protrusion move in the predetermined direction along the spiral recess to adjust a distance between the first housing and the second housing, and
wherein the first cover comprises:
at least one guide groove formed in one face of the first cover facing the first connection unit and the second connection unit and configured to guide a movement of the first connection unit or the second connection unit, and
a stopper groove disposed to be spaced apart from the guide groove and configured to limit the movement of the first connection unit or the second connection unit.

2. The electronic device of claim 1, wherein the circular plate is further configured such that, as the first region and the second region of the circular plate are varied, an interval between the first region and the second region is changed.

3. The electronic device of claim 2, wherein a first distance between an end of the first connection unit, which faces the second housing, and the first protrusion, is different from a second distance between an end of the second connection unit, which faces the first housing, and the second protrusion.

4. The electronic device of claim 3,
wherein the first protrusion and the second protrusion are disposed to be aligned with a predetermined axis, and
wherein, as a distance between an end of the first housing and an end of the second housing is adjusted, a distance between the first display device and the second display device is adjustable.

5. The electronic device of claim 4, wherein the interval between the first region and the second region is changed in a horizontal direction with respect to a length direction between the first protrusion and the second protrusion, which are disposed parallel to each other.

6. The electronic device of claim 1, wherein the first connection unit comprises:
- at least one first guide line protruding toward the first face of the electronic device, engaged with the guide groove of the first cover, and configured to guide a slide movement of the first connection unit in the predetermined direction;
- a second guide line protruding toward the first face of the electronic device, engaged with the stopper groove of the first cover, and configured to limit a movement distance of the slide movement of the first connection unit;
- the first protrusion protruding toward a second face of the electronic device, which is opposite the first face of the electronic device; and
- a first side portion disposed to face the second housing, the first side portion comprising a first recess formed in at least a portion thereof.

7. The electronic device of claim 6, wherein the at least one first guide line
- is disposed in an upper end region or a lower end region of the first connection unit, and
- wherein the second guide line is disposed to be spaced apart from the at least one first guide line.

8. The electronic device of claim 1, wherein the second connection unit comprises:
- at least one third guide line protruding toward the first face of the electronic device, engaged with the guide groove of the first cover, and configured to guide a slide movement of the second connection unit in the predetermined direction;
- a fourth guide line protruding toward the first face of the electronic device, engaged with the stopper groove of the first cover, and configured to limit a movement distance of the slide movement of the second connection unit; and
- the second protrusion protruding toward a second face of the electronic device.

9. The electronic device of claim 8, wherein the at least one third guide line
- is disposed in an upper end region or a lower end region of a second front portion, and
- wherein the fourth guide line is disposed to be spaced apart from the at least one third guide line.

10. The electronic device of claim 6,
- wherein the second connection unit further comprises a second side portion disposed to face the first housing, the second side portion comprising a second recess formed in at least a portion thereof, and
- wherein the first recess of the first connection unit and the second recess of the second connection unit are coupled to each other, and are configured to form an opening of a closed line.

11. The electronic device of claim 1,
- wherein the circular plate and the first cover are disposed to face each other across the first protrusion of the first connection unit and the second protrusion of the second connection unit therebetween, and
- wherein the circular plate comprises a through hole disposed in a center of the spiral recess and formed through the circular plate.

12. The electronic device of claim 1,
- wherein the spiral recess extends with a constant width, and
- wherein at least a portion of the circular plate is disposed to be exposed outside of the electronic device and is configured to allow a user to touch and rotate at least a portion of the circular plate.

13. The electronic device of claim 1, further comprising:
- a second cover disposed to face a second face of the electronic device and to enclose at least a portion of the circular plate,
- wherein the second cover comprises:
  - a boss disposed to pass through the circular plate and to extend toward the first cover,
  - at least one hook configured to be coupled with the first cover, and
  - an opening formed in at least a portion of an upper end region and configured to expose at least a portion of the circular plate.

14. The electronic device of claim 13, wherein the boss of the second cover and a through hole in the circular plate are arranged on a same line.

15. An electronic device comprising:
- a first display device configured to provide visual information;
- a second display device disposed to be spaced apart from the first display device and configured to provide visual information; and
- a distance adjustment structure disposed between the first display device and the second display device, and configured to adjust a distance between the first display device and the second display device,
- wherein the distance adjustment structure comprises:
  - a first connection unit disposed to extend from the first display device toward the second display device and comprising a first protrusion disposed to protrude in a direction perpendicular to an extension direction,
  - a second connection unit disposed to extend from the second display device toward the first display device and comprising a second protrusion disposed to protrude in a direction perpendicular to the extension direction,
  - a curved plate comprising a spiral recess, such that the first protrusion and the second protrusion are seated in the spiral recess in a state of being spaced apart from each other, so as to provide a spiral movement, and
  - a first cover facing a first face of the electronic device and disposed to enclose at least a portion of the first connection unit and the second connection unit,
- wherein, as the curved plate rotates, a distance between the first protrusion and the second protrusion disposed in the spiral recess is varied, and
- wherein the first cover comprises:
  - at least one guide groove formed in one face of the first cover facing the first connection unit and the second connection unit and configured to guide a movement of the first connection unit or the second connection unit, and
  - a stopper groove disposed to be spaced apart from the guide groove and configured to limit the movement of the first connection unit or the second connection unit.

16. The electronic device of claim 15,
- wherein a first distance is formed from an end of the first connection unit, which faces the second display device, to the first protrusion,
- wherein a second distance is formed from an end of the second connection unit, which faces the first display device, to the second protrusion, and
- wherein the first distance and the second distance are different from each other.

17. The electronic device of claim 16,
wherein one face of the first connection unit and one face of the second connection unit face each other, and
wherein as the curved plate rotates, a distance between the first connection unit and the second connection unit is adjustable from a first predetermined distance to a second predetermined distance.

18. The electronic device of claim 15, further comprising:
a guide member comprising a shaft shape disposed to pass through the first connection unit and the second connection unit, and configured to guide a horizontal movement of the first connection unit and the second connection unit.

19. The electronic device of claim 15, wherein the first connection unit comprises:
   at least one first guide line protruding toward the first face of the electronic device, engaged with the guide groove of the first cover, and configured to guide a slide movement of the first connection unit in a predetermined direction;
   a second guide line protruding toward the first face of the electronic device, engaged with the stopper groove of the first cover, configured to limit a movement distance of the slide movement of the first connection unit; and
   the first protrusion protruding toward a second face of the electronic device, the second face being opposite the first face of the electronic device.

20. The electronic device of claim 15, wherein the second connection unit comprises:
   at least one third guide line protruding toward the first face of the electronic device, engaged with the guide groove of the first cover, and configured to guide a slide movement of the second connection unit in a predetermined direction;
   a fourth guide line protruding toward the first face of the electronic device, engaged with the stopper groove of the first cover, configured to limit a movement distance of the slide movement of the second connection unit; and
   the second protrusion protruding toward a second face of the electronic device, the second face being opposite the first face of the electronic device.

* * * * *